United States Patent [19]
Morimoto et al.

[11] Patent Number: 5,513,737
[45] Date of Patent: May 7, 1996

[54] DEVICE FOR TRANSFERRING SOLID ARTICLES

[75] Inventors: Shuji Morimoto, Suita; Shiro Sato, Ikeda; Yutaka Sakuma, Osaka; Haruo Iijima, Yokosuka, all of Japan

[73] Assignee: Takeda Chemical Industries, Ltd., Osaka, Japan

[21] Appl. No.: 301,007

[22] Filed: Sep. 6, 1994

[30] Foreign Application Priority Data

Sep. 7, 1993 [JP] Japan ............... 5-048442 U
Mar. 25, 1994 [JP] Japan ............... 6-054302

[51] Int. Cl.⁶ .................................. B65G 11/06
[52] U.S. Cl. .................................. 193/12
[58] Field of Search ............ 193/12; 198/778; 221/24, 155

[56] References Cited

U.S. PATENT DOCUMENTS

| | | | |
|---|---|---|---|
| 833,249 | 10/1906 | Schwab | 193/12 |
| 1,017,723 | 2/1912 | Woodbridge | 193/12 X |
| 1,710,779 | 4/1929 | Mabee | 193/12 |
| 3,254,881 | 6/1966 | Rusk | 193/12 |
| 4,666,033 | 5/1987 | Reid | 193/12 X |
| 4,790,355 | 12/1988 | Kennedy | 193/12 X |
| 5,083,651 | 1/1992 | Wiese | 193/12 |
| 5,097,816 | 3/1992 | Miller | 193/12 X |

FOREIGN PATENT DOCUMENTS

| | | |
|---|---|---|
| 2223265 | 10/1974 | France . |
| 804905 | 3/1951 | Germany . |
| 1-127420 | 6/1986 | Japan . |
| 2-147519 | 6/1990 | Japan . |
| 1573820 | 8/1980 | United Kingdom . |

OTHER PUBLICATIONS

Patent Abstracts of Japan, vo. 14, No. 393 (M–1015) Aug. 24, 1990.

*Primary Examiner*—James R. Bidwell
*Attorney, Agent, or Firm*—Wenderoth, Lind & Ponack

[57] ABSTRACT

A transfer device is disposed vertically between an apparatus for carrying out a process and a further apparatus for carrying out a subsequent process so as to transfer solid articles from the apparatus to the further apparatus by gravity. The transfer device includes a cylindrical member which extends vertically and is provided, at its upper and lower portions, with a solid article supplying portion and a solid article discharge portion, respectively. A guide member is provided for effecting flow of the solid articles. The guide member is fixed to the cylindrical member so as to extend through a hollow defined in the cylindrical member from the solid article supplying portion to the solid article discharge portion. The guide member includes a central shaft extending through an axis of the cylindrical member, and a vane turning helically about an axis of the central shaft and projecting from an outer peripheral surface of the central shaft such that a whole outer peripheral edge of the vane extends in close proximity to an inner peripheral surface of the cylindrical member.

18 Claims, 16 Drawing Sheets

5,513,737

DEVICE FOR TRANSFERRING SOLID ARTICLES

BACKGROUND OF THE INVENTION

The present invention generally relates to a device for transferring solid articles and more particularly, to a device for transferring a large amount of solid articles such as pharmaceutical tablets in a short period without causing damage to the solid articles.

Generally, devices for transferring solid articles in production processes include, for example, a rotary screw type transfer device for transferring solid articles by rotating a screw, a pneumatic conveying type transfer device in which solid articles are fed by air blown into a pipe or by suction under vacuum and mechanical transfer devices such as a bucket type transfer device, a belt type transfer device, a shooter type transfer device, etc.

In these mechanical transfer devices, external force applied to solid articles during their transfer may cause damage to surfaces of the solid articles, thereby resulting in fracture or chipping of the solid articles in some cases. Therefore, in such cases, the mechanical transfer devices cannot be used for transferring pharmaceutical tablets or the like.

Especially, transfer of sugar-coated tablets is a final process of production of the tablets. Since the final process should maintain a strict quality level, it is difficult for these mechanical transfer devices to be used for transferring the sugar-coated tablets. Therefore, in many cases, the tablets are put into a transfer container so as to be transferred together with the transfer container during transfer from a sugar coating process to the subsequent printing and inspection process. It is also considered that this transfer is automated by using an unmanned transfer carrier, etc. However, this automation requires complicated apparatuses and thus, cannot be performed at low cost. As a result, transfer from the sugar coating process to the subsequent printing and inspection process is generally performed manually by using a pallet.

A shuttle type transfer device shown in FIG. 1 is known as an automatic transfer device for transferring solid articles A such as tablets without causing damage to the solid articles A. In the known shuttle type transfer device, front, middle and rear transfer plates 51a, 51b and 51c are coupled by a flexible shaft 52 so as to constitute a shuttle 50 and this shuttle 50 is disposed in a pipe 53. An air flow path 58 for transferring the solid articles A is provided at one end 54 of the pipe 53.

The solid articles A loaded from a loading aperture 56 at the end 54 of the pipe 53 are accommodated in a space between the front and middle transfer plates 51a and 51b and are transferred towards the other end 55 of the pipe 53 by pneumatic pressure. After the shuttle 50 has reached the other end 55 of the pipe 53 and the solid articles A have been discharged from a discharge aperture 57, vacuum pressure for sucking air in the pipe 53 from the air flow path 58 or pneumatic pressure from the other end 55 of the pipe 53 returns the empty shuttle 50 to the end 54 of the pipe 53, which has the loading aperture 56.

In this known shuttle type transfer device, since the solid articles A are transferred together with the shuttle 50 reciprocating in the pipe 53, the solid articles A do not impinge upon each other and are seldom subjected to external force. Therefore, in addition to such a merit that the solid articles A can be transferred without causing damage to the solid articles A, the known shuttle type transfer device is also advantageous in that since the solid articles A are transferred in the pipe 53, an in-line system or a closed system can be provided.

However, in the known shuttle type transfer device, the amount of the solid articles A capable of being transferred by one reciprocation of the shuttle 50 is limited by capacity of the shuttle 50 for accommodating the solid articles A. Furthermore, the known shuttle type transfer device has such a drawback that since during return of the shuttle 50 to the loading aperture 56, the shuttle 50 is transferred in an empty state and thus, transfer of the solid articles A is suspended, efficiency for transferring the solid articles A is quite low, so that a large amount of the solid articles A cannot be transferred in a short period.

Meanwhile, since the known shuttle type transfer device requires a power source for supplying or sucking air in order to reciprocate the shuttle 50, maintenance and inspection of the known transfer device are troublesome and the known shuttle type transfer device cannot be obtained at low cost.

SUMMARY OF THE INVENTION

Accordingly, an essential object of the present invention is to provide, with a view to eliminating the above mentioned inconveniences of conventional transfer devices, a transfer device of simple construction whose operation is based on the use of gravity and requires no power source and, which not only is capable of transferring a large amount of solid articles in a short period without causing damage to the solid articles but facilitates automation and provision of an in-line system and a closed system.

In order to accomplish this object of the present invention, a transfer device is disposed vertically between an apparatus for carrying out a process and a further apparatus for carrying out a subsequent process so as to transfer solid articles from the apparatus to the further apparatus by gravity. The transfer device comprises: a cylindrical member which extends vertically and is provided, at its upper and lower portions, with a solid article supplying portion and a solid article discharge portion, respectively; and a guide member for effecting flow of the solid articles, which is fixed to the cylindrical member so as to extend through a hollow defined in the cylindrical member from the solid article supplying portion to the solid article discharge portion and which includes a central shaft extending through an axis of the cylindrical member and a vane turning helically about an axis of the central shaft and projecting from an outer peripheral surface of the central shaft such that a whole outer peripheral edge of the vane extends in close proximity to an inner peripheral surface of the cylindrical member.

Usually, the vane, i.e., both the central shaft and the vane extend continuously from the solid article supplying portion to the solid article discharge portion. However, according to an aspect of the present invention, the vane may be discontinuously provided between the solid article supplying portion and the solid article discharge portion to such an extent that safety of transfer of the solid articles is not jeopardized from a standpoint of saving of materials used for the guide member. At this time, it is needless to say that the central shaft extends continuously from the solid article supplying portion to the solid article discharge portion.

According to another aspect of the present invention, a clearance between the whole outer peripheral edge of the vane and the inner peripheral surface of the cylindrical member is set to be dimensionally smaller than an outer shape of each of the solid articles in order to prevent the solid articles from being caught in the clearance or dropping from the clearance, wherein a guide face for effecting flow of the solid articles is formed on an upper face of the vane so as to cover the hollow in the cylindrical member substantially fully when viewed from above.

According to another aspect of the present invention, the whole outer peripheral edge of the vane has an angle of slope ranging from 10° to 40°, more preferably from 20° to 30°. According to another aspect of the present invention, it is preferable that the angle of slope of the vane is set to be gradually smaller towards the solid article discharge portion so as to reduce transfer rate of the solid articles at the solid article discharge portion such that transfer rate of the solid articles at the solid article discharge portion becomes identical with low transfer rate of the solid articles at the solid article supplying portion.

Meanwhile, according to another aspect of the present invention, the guide face of the vane is inclined upwardly from the axis of the cylindrical member towards the inner peripheral surface of the cylindrical member.

According to another aspect of the present invention, it is preferable that the guide face of the vane has an angle of inclination ranging from 10° to 40° such that the solid articles on the guide face are transferred in conglomerate flow.

Meanwhile, the guide face of the vane is not necessarily required to be inclined upwardly relative to the inner peripheral surface of the cylindrical member and may also be formed perpendicularly to the axis of the cylindrical member. At this time, if the solid articles are provided in layers piled on the guide face, the solid article are likely to be transferred in layers such that the solid articles in each layer flow integrally.

According to another aspect of the present invention, the guide member may include a plurality of the vanes such that the vanes overlap each other.

According to another aspect of the present invention, it is preferable that the cylindrical member is molded by transparent resin and the guide member is made of resin through integral molding of the central shaft and the vane such that an iron core is embedded in the central shaft at the axis of the central shaft. As long as the inner peripheral surface of the cylindrical member, which is brought into contact with the solid articles, is smooth, the cylindrical member may be made of any material, for example, synthetic resin such as polycarbonate or metal such as stainless steel. However, when the cylindrical member is made of synthetic resin, its inner peripheral surface, which is brought into contact with the solid articles, can be formed more softly than that of the cylindrical member made of metal and thus, does not cause damage to the solid articles if surface strength of the solid articles is small as in the case of sugar-coated tablets.

Meanwhile, the guide member may be made of such a material that the solid articles can be moved smoothly on the guide face without being damaged. Thus, in addition to synthetic resin such as ultra-high-density polyethylene and metal such as stainless steel, the guide member may be formed by a cloth stretched over a frame. However, in the same manner as the cylindrical member, it is preferable that when the solid articles are sugar-coated tablets, the guide member is made of synthetic resin such that surface of the guide member, which is brought into contact with the solid articles, is formed softly. Furthermore, it is preferable that the guide member is made of material having excellent shock resistance and wear resistance. From this standpoint, ultra-high-density polyethylene is more preferable for its excellent self-lubrication and workability.

According to another aspect of the present invention, it is preferable that the guide member is detachably fixed to the cylindrical member. For example, a pair of opposite slots are formed on an upper end face of the cylindrical member and a clamp rod is attached to an upper end portion of the guide member such that opposite ends of the clamp rod are detachably fitted into the slots. As a result, the guide member is detachably fixed to the cylindrical member.

According to another aspect of the present invention, the cylindrical member has an inside diameter of 80 to 150 mm. Inside diameter of the cylindrical member and corresponding outside diameter of the guide member are not necessarily required to be made uniform from the solid article supplying portion to the solid article discharge portion but may be, for example, increased towards the solid article discharge portion. In this case, since the helical angle of the guide member becomes gentler towards the solid article discharge portion, acceleration of the solid articles can be prevented and thus, transfer rate of the solid articles at the solid article discharge portion can be made identical with that at the solid article supplying portion. On the contrary, in case inside diameter of the cylindrical member and outside diameter of the guide member are reduced towards the solid article discharge portion, the guide passage is constricted at the solid article discharge portion and thus, discharge speed of the solid articles can be lowered.

According to another aspect of the present invention, a supply pipe is coupled with the solid article supplying portion so as to extend slopingly upwardly from the solid article supplying portion. Angle of inclination of the supply pipe is preferably set such that the solid articles are not accelerated in the supply pipe. In case the solid articles do not flow slidably by their own weight, the solid articles may be transferred by providing, for example, a vibrator on the supply pipe.

Meanwhile, according to another aspect of the present invention, an on-off valve is provided between the solid article supplying portion and the supply pipe. This on-off valve desirably has a construction which does not damage the solid articles as in the case of a flow control type on-off valve.

According to another aspect of the present invention, a guide member may be preferably formed by a plurality of guide member sections extending in series along the axis of the cylindrical member such that a gap smaller dimensionally than outer shape of each of the solid articles is formed between neighboring ones of the guide member sections.

In order to form the above gap, an opening is formed on the central shaft of each of the guide member sections and the long iron core is fitted into the opening.

According to another aspect of the present invention, a cushioning member is provided so as to confront an outlet of the solid article discharge portion. The cushioning member should absorb kinetic energy of the solid articles without damaging the solid articles. To this end, the cushioning member may be formed by a brushlike member having a plurality of fibers extending outwardly substantially horizontally from the central shaft of the guide member, a sheetlike member made of elastic material such as rubber or flexible material such as sponge, a net, a number of threadlike pieces hung downwardly and a fibrous member such as a cloth.

According to another aspect of the present invention, a discharge pipe is coupled with the solid article discharge portion so as to extend slopingly downwardly from the solid article discharge portion. In the same manner as the supply pipe, angle of inclination of the discharge pipe is preferably set such that the solid articles are not accelerated in the discharge pipe. In case the solid articles do not flow slidably by their own weight, the solid articles may be transferred by providing, for example, a vibrator on the discharge pipe.

Meanwhile, according to another aspect of the present invention, a shock absorber is provided at a portion of an inner surface of the discharge pipe such that the portion is disposed immediately below the solid article discharge portion. In the same manner as the cushioning member referred to above, the shock absorber should absorb kinetic energy of the solid articles without damaging the solid articles. To this end, the shock absorber may be formed by an elastic member such as a spring or rubber, flexible material such as a sponge, a bag containing gas such as air or liquid, a fibrous member such as a cloth and a brushlike member. Alternatively, the shock absorber may be formed by spouting gas such as air.

According to another aspect of the present invention, it is preferable that each of the solid articles to be transferred by the transfer device of the present invention has a smooth spherical surface. In case the solid articles are sugar-coated tablets or film coated tablets, which have small surface strength the transfer device of the present invention can be used quite suitably. However, the solid articles to be transferred by the transfer device of the present invention are not limited to the above items. Namely, as long as the solid articles have proper size and hardness, for example, foods such as candy and decorative articles such as beads in addition to pharmaceutical tablets, the solid articles may have an arbitrary shape, for example, sphere, capsule, cylinder, rectangular parallelopiped, annulus and other special shapes. In addition to a sugar-coated tablet which has a glassy surface likely to be damaged by shock, the tablets may be of any type such as an uncoated tablet and a film coated tablet.

In the transfer device of the present invention, the solid articles supplied from the solid article supplying portion disposed at the upper portion of the cylindrical member are received by the guide face formed on the upper face of the guide member and flow helically about the axis of the cylindrical member by action of gravity while sliding on the guide face. When the solid articles have reached the lower portion of the cylindrical member, the solid articles are discharged from the solid article discharge portion. At this time, transfer rate of the solid articles will be increased by gravity but the solid articles are turned by the guide face so as to produce centrifugal force such that the centrifugal force is received by the inner peripheral surface of the cylindrical member. Therefore, transfer rate of the solid articles is properly controlled in accordance with helical angle of the guide member. Accordingly, in the case of transfer of a small amount of the solid articles, the solid articles do not impinge upon one another violently.

Meanwhile, in the case of transfer of a large amount of the solid articles each having a smooth spherical surface, the solid articles flow in layers so as to be transferred helically downwardly. Namely, the solid articles form the layers piled on the guide face and the solid articles in each layer are integrally turned at a substantially identical peripheral speed so as to slidably flow downwardly.

Since the solid article in the lower layers are subjected to pressure from the solid articles in the upper layers, sliding frictional resistance of the solid articles in the lower layers closer to the guide face becomes larger and sliding frictional resistance of the solid articles in the upper layers farther away from the guide face becomes smaller. As a result, since difference in speed between the solid articles in the lower layers and the solid articles in the upper layers is produced, the solid articles in the upper layer farther away from the guide face are moved at higher speed. However, since the solid articles of one layer neither penetrate into a gap formed in the solid articles of another layer nor are shifted to the solid articles of another layer, such a phenomenon does not take place that the solid articles impinge upon one another violently during transfer so as to damage one another.

Usually, the guide member, i.e., both the central shaft and the vane extend continuously from the solid article supplying portion to the solid article discharge portion. However, in the transfer device of another arrangement of the present invention, the vane is discontinuously provided between the solid article supplying portion and the solid article discharge portion. The guide member having the discontinuous vane functions in the same manner as the guide member having the continuous vane.

In the transfer device of another arrangement of the present invention, since the clearance formed between the whole outer peripheral edge of the vane and the inner peripheral surface of the cylindrical member is set to be dimensionally smaller than outer shape of each of the solid articles to be transferred, it is possible to prevent the solid articles from being caught in the clearance or dropping from the clearance.

In the transfer device of another arrangement of the present invention, the whole outer peripheral edge of the vane has an angle of slope ranging from 10° to 40°. Therefore, if each of the solid articles has a smooth spherical surface as in the case of sugar-coated tablets or film coated tablets, the solid articles can be transferred along the guide face at proper speed. Namely, when the angle of slope of the vane is larger than 40°, transfer rate of the solid article is too high. As a result, such inconveniences are likely to be incurred that the solid articles jump from the guide face and impinge upon the solid articles which have been transferred previously. On the other hand, when the angle of slope of the vane is smaller than 10°, transfer rate of the solid articles is too low, so that the solid articles are readily stopped on the guide face and thus, are not transferred smoothly.

In the transfer device of another arrangement of the present invention, since the angle of slope of the vane is set to be gradually smaller towards the solid article discharge portion, transfer rate of the solid articles at the solid article discharge portion lowered so as to become identical with that at the solid article supplying portion. Therefore, from the upper end to the lower end of the cylindrical member, the solid articles can be transferred in the cylindrical member at a substantially identical speed. In the transfer device, at a radially outer portion of flow of the solid articles which are transferred while being guided by the guide face of the guide member, centrifugal force produced by turning of the solid articles or pressure of the solid articles is applied to the inner peripheral surface of the cylindrical member and thus, frictional resistance is produced.

In the transfer device of another arrangement of the present invention, since the guide face of the vane is inclined upwardly from the axis of the cylindrical member towards the inner peripheral surface of the cylindrical member, the solid articles will slidably flow towards the axis of the cylindrical member by action of gravity. Therefore, pressure and centrifugal force of the solid articles are eliminated by a component of a force, which is directed towards the axis of the cylindrical member and thus, frictional resistance produced on the inner peripheral surface of the cylindrical member is lessened. As a result, since the solid articles flow smoothly also at the radially outer portion along the inner peripheral surface of the cylindrical member, frictional resistance of the solid articles in the lower layers is reduced and difference in speed between the solid articles in the upper layers and the solid articles in the lower layers is lessened. Accordingly, the solid articles in the upper layers and the solid articles in the lower layer have an identical peripheral speed. Namely, at this time, since the solid articles form a conglomerate flow in which the solid articles behave integrally as a whole without change in relative positions of the solid articles, the solid articles flow more stably so as to be transferred on the guide face downwardly.

Meanwhile, when each of the solid articles does not have a smooth spherical surface, such a case may happen that even if the guide face is not inclined upwardly, a conglomerate flow is formed such that the solid articles on the guide face are transferred integrally.

When the upward angle of inclination of the guide face ranges from 10° to 40° a conglomerate flow can be produced at proper speed in case the solid articles are sugar-coated tablets or film coated tablets, each of which has a smooth spherical surface.

In the transfer device of another arrangement of the present invention, the guide member includes a plurality of the vanes such that the vanes overlap each other. Therefore, even in the case of transfer of a large amount of the solid articles as a whole, height of layers of the solid articles piled on each guide member is reduced. As a result, since force applied to the solid articles in the lowermost layer is lessened, resistance produced on each guide face by the solid articles is reduced.

In the transfer device of another arrangement of the present invention, since the cylindrical member is made transparent, transfer state of the solid articles can be observed from outside. Meanwhile, if the cylindrical member and the guide member are molded by resin, surfaces of the cylindrical member and the guide member, which are brought into contact with the solid articles, can be made soft. Therefore, even if surface strength of the solid articles is small, the solid articles are not damaged through their contact with or their friction with the surfaces of the cylindrical member and the guide member. Furthermore, if the iron core is embedded in the central shaft of the guide member along the axis of the central shaft, strength of the guide member can be increased in the case where the guide member is long.

In the transfer device of another arrangement of the present invention, since the guide member can be easily removed from the cylindrical member, the cylindrical member and the guide member can be easily rinsed by removing the guide member from the cylindrical member. In addition, foreign matter caught in the clearance between the cylindrical member and the guide member can be removed.

When the cylindrical member has an inside diameter of 80 to 150 mm, the solid articles can be transferred at proper speed without being damaged in case the solid articles are sugar-coated tablets or film coated tablets.

In the transfer device of another arrangement of the present invention, since the supply pipe is coupled with the solid article supplying portion so as to extend slopingly upwardly from the solid article supplying portion, the solid articles are least likely to be accelerated in the supply pipe and supply speed of the solid articles to the solid article supplying portion is restrained to a low value.

In the transfer device of another arrangement of the present invention, the supply pipe is coupled with the solid article supplying portion through the on-off valve. Therefore, when the solid articles supplied from above are received by the on-off valve temporarily by closing the on-off valve, kinetic energy of transfer of the solid articles in the supply pipe is absorbed.

In the transfer device of another arrangement of the present invention, the gap is formed between the neighboring ones of the guide member sections. Accordingly, when the transfer device is rinsed, detergent readily enter the gap. In addition, cleaning fluid which has entered gap is rinsed away easily by rinsing water and this rinsing water is easily removed by air-drying, hot-air drying, etc.

In the transfer device of the arrangement of of the present invention, since the guide member sections are sequentially mounted on the long iron core by fitting the iron core into the guide member sections, the gap can be easily formed at a desired dimension.

In the transfer device of another arrangement of the present invention, since the cushioning member is provided so as to confront the outlet of the helical guide passage of the solid article discharge portion, kinetic energy of the solid articles transferred helically is absorbed by the cushioning member such that the solid articles are uniformly transferred downwardly.

In the transfer device of another arrangement of the present invention, since the discharge pipe is slopingly coupled with the solid article discharge portion, the solid articles are less likely to be accelerated in the discharge pipe and thus, the solid articles are discharged in conglomerate flow from the solid article discharge portion to the discharge pipe.

In the transfer device of another arrangement of the present invention, since the shock absorber is provided at the portion of the inner surface of the discharge pipe immediately below the solid article discharge portion, the solid articles transferred by the guide member do not directly impinge upon the inner surface of the discharge pope at high speed and kinetic energy of the solid articles is absorbed by the shock absorber.

When each of the solid articles has a smooth spherical surface, the solid articles can be transferred quite favorably by the transfer device of gravity type. Especially when the solid articles are sugar-coated tablets or film coated tablets, whose surface strength is small, the solid articles are transferred at a constant speed without jumping from the guide face of the vane and are prevented from impinging upon one another, so that surfaces of the solid articles are not damaged.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
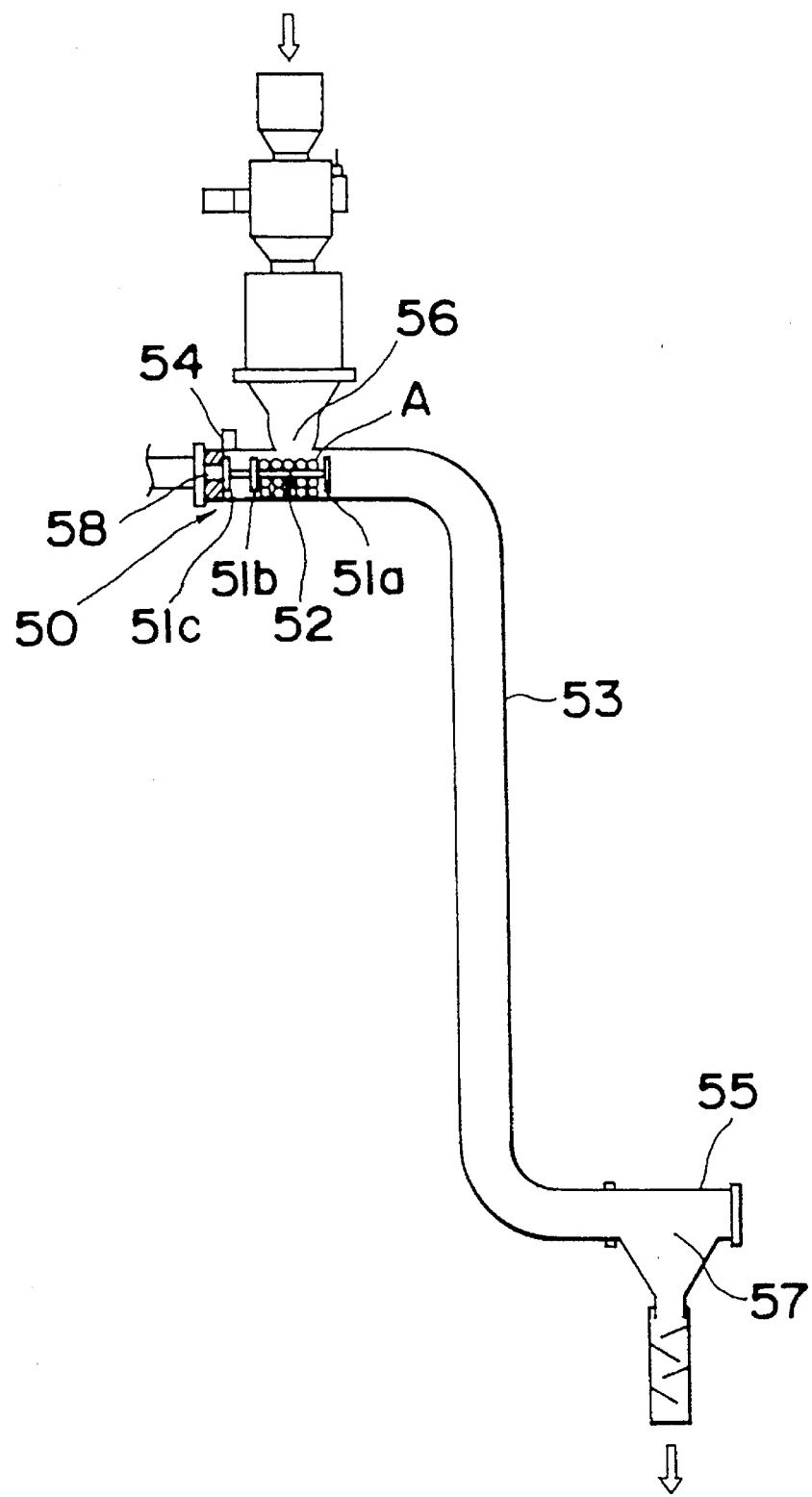
FIG. 1 is a vertical sectional view of a prior art tablet transfer device (already referred to)
Figure 2:
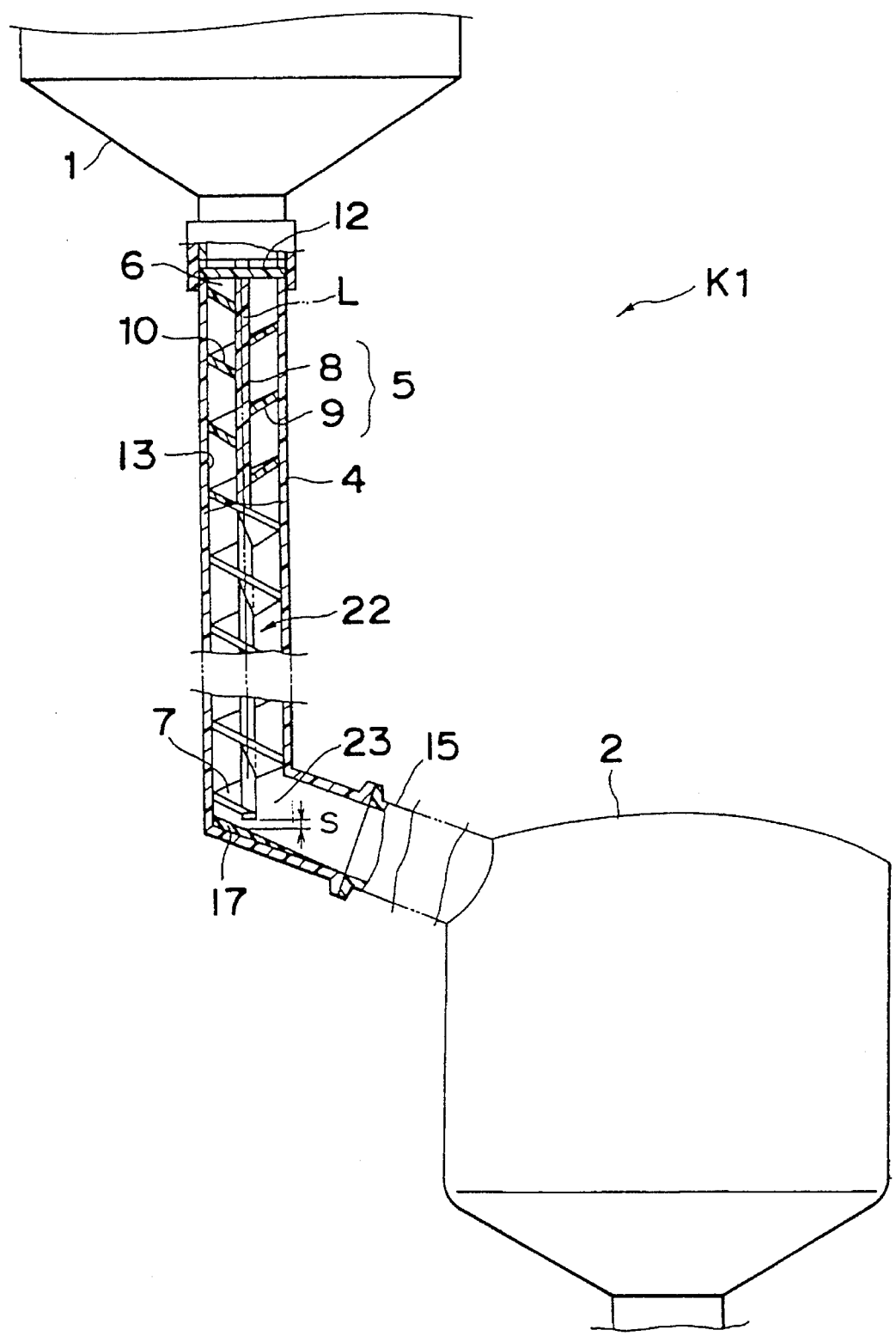
FIG. 2 is a vertical sectional view of a tablet transfer device according to a first embodiment of the present invention.

Referring now to the drawings, there is shown in FIGS. 2 to 6, a tablet transfer device K1 according to a first embodiment of the present invention. In production processes of tablets A (FIG. 4), the tablet transfer device K1 is used for transferring the tablets A from a sugar coating process to a printing and inspection process. As shown in FIG. 2, the tablet transfer device K1 is provided between a tank 1 for accommodating the tablets A having undergone the sugar coating process and a hopper 2 for the subsequent printing and inspection process.

The tablet transfer device K1 includes a vertically extending cylindrical member 4 and a helical guide member 5 fixed in the cylindrical member 4. The cylindrical member 4 is made of transparent polycarbonate and has an inside diameter of 105 mm and a height of 2 m. A tablet supplying portion 6 and a tablet discharge portion 7 are, respectively, provided at upper and lower portions of the cylindrical member 4. The tablet supplying portion 6 is coupled with the tank 1 for the sugar coating process, while the tablet discharge portion 7 is coupled with the hopper 2 for the printing and inspection process through a slopingly downwardly extending discharge pipe 15.

Meanwhile, in order to smoothly transfer the tablets A without causing damage to the tablets A, it is preferable that a joint portion between the tablet supplying portion 6 of the cylindrical member 4 and the tank 1, a joint portion between the tablet discharge portion 7 and the discharge pipe 15, joint portions in the guide member 5, joint portions in the cylindrical member 4 obtained by connecting in series a plurality of cylindrical member sections and a joint portion between a supply pipe 19 (FIG. 8) to be described later and the tablet supplying portion 6 do not have even small surface roughnesses. To this end, after these joint portions have been connected by using a joint such as a ferrule, welding or bonding, surfaces of the joint portions are finished smoothly.

Figure 3:
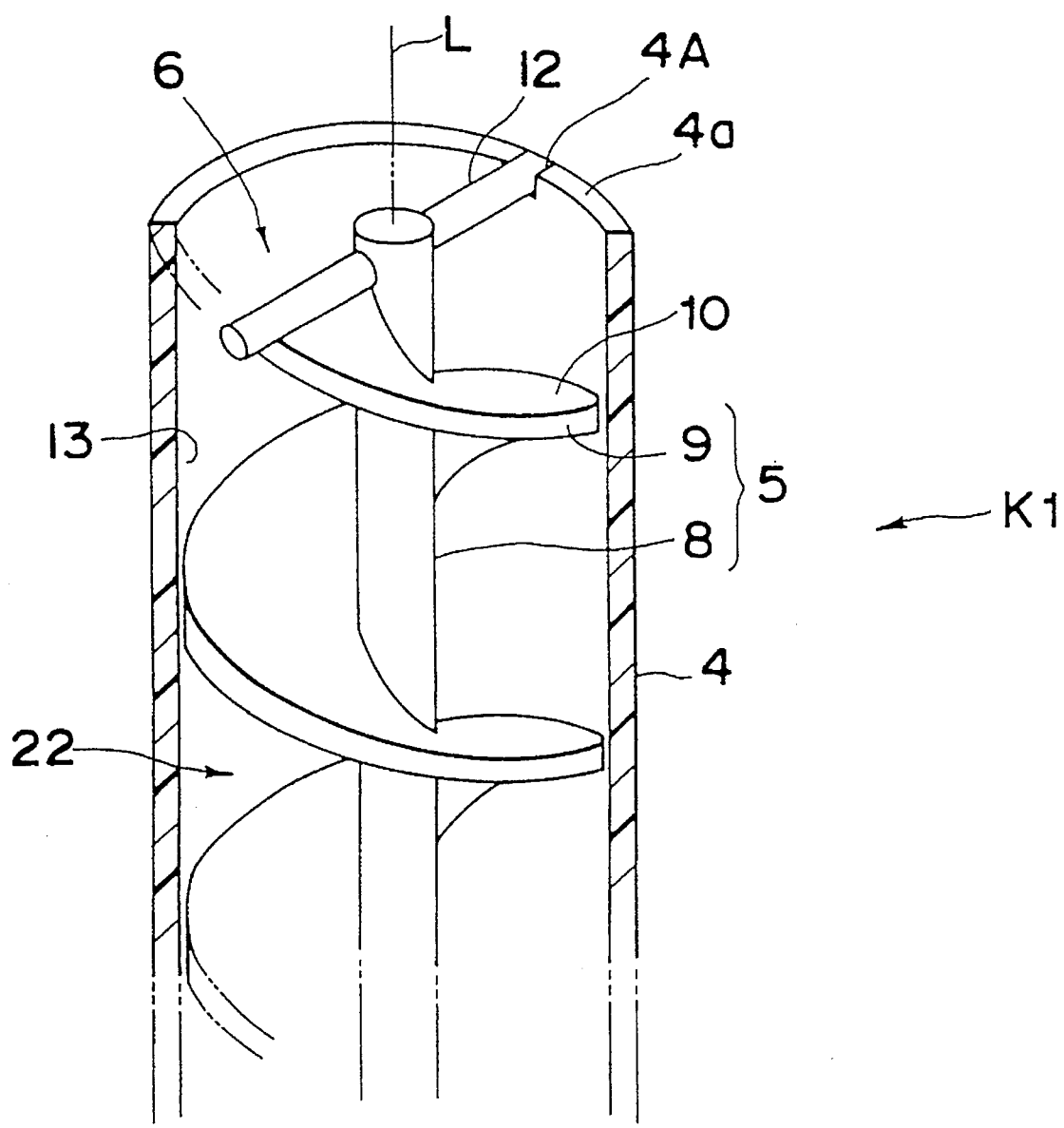
FIG. 3 is an enlarged broken perspective view of a tablet supplying portion of the tablet transfer device of FIG. 2.
Figure 5:
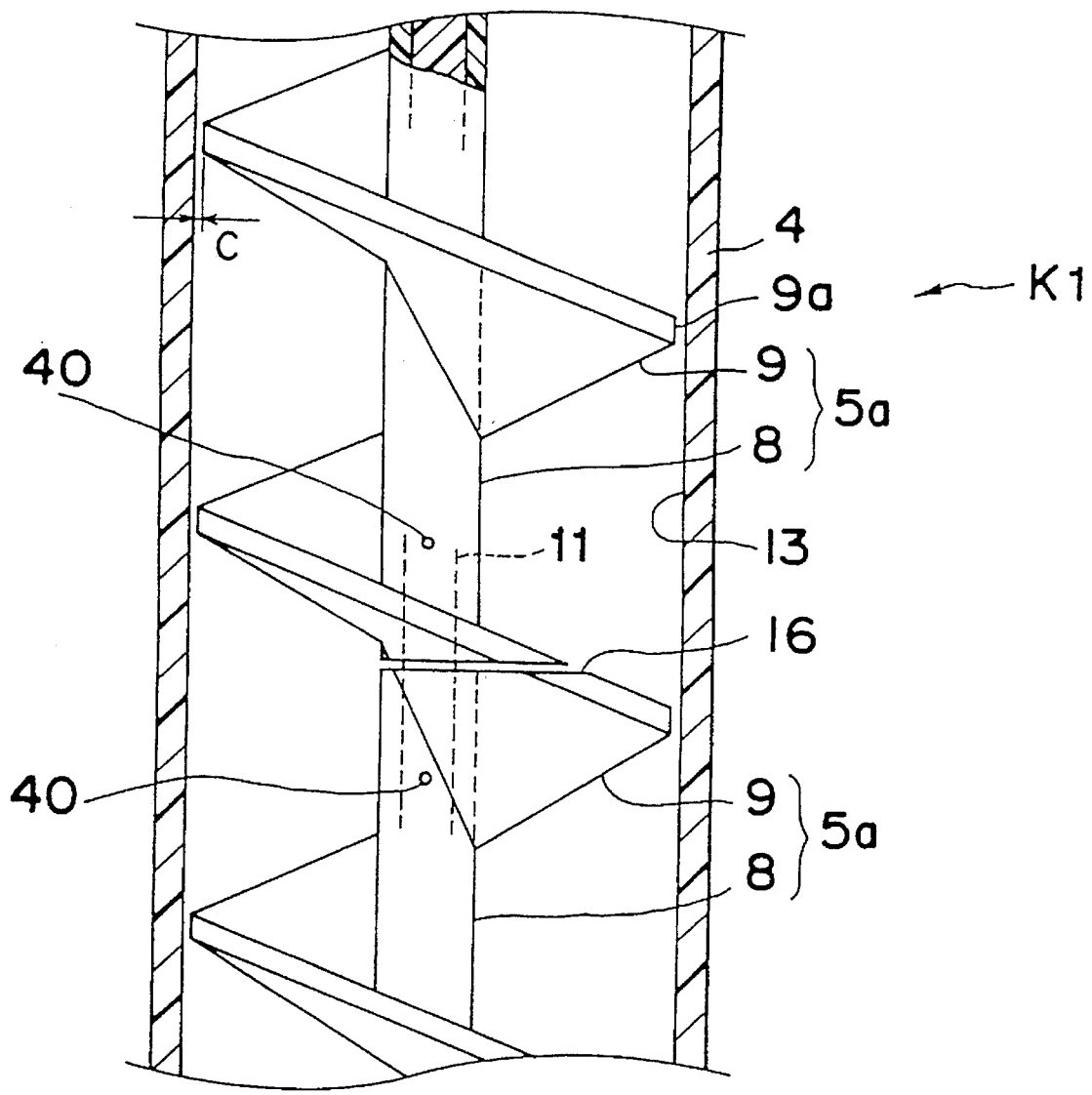
FIG. 5 is an enlarged front elevational view of a joint portion of a guide member employed in the tablet transfer device of FIG. 2.
Figure 6:
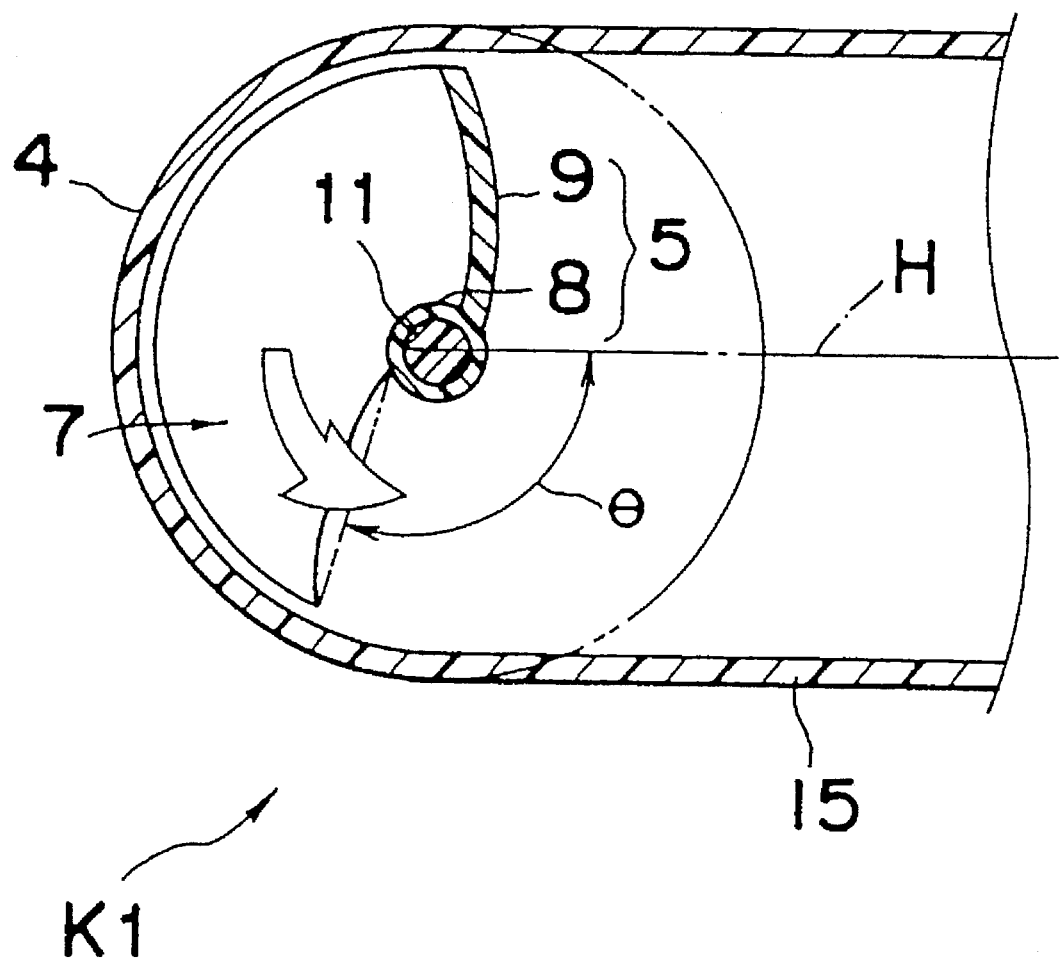
FIG. 6 is an enlarged horizontal sectional view of a tablet discharge portion employed in the tablet transfer device of FIG. 2.

The guide member 5 is made of ultra-high-density polyethylene and includes a central shaft 8 extending through an axis L of the cylindrical member 4 from the tablet supplying portion 6 to the tablet discharge portion 7 and a helical vane 9 formed integrally around the central shaft 8 such that a guide face 10 is formed on an upper face of the vane 9. The central shaft 8 has an outside diameter of 20 mm. As shown in FIG. 5, an opening is formed at an axis of the central shaft 8 and an iron core 11 is fitted into the opening of the central shaft 8 such that the central shaft 8 is secured to the iron core 11 by using pins 40. As shown in FIG. 3, a clamp rod 12 is provided at an upper end portion of the central shaft 8 and opposite ends of the clamp rod 12 are fitted into a pair of slots 4A formed on an upper end 4a of the cylindrical member 4 so as to extend at right angles to the central shaft 8. Through detachable engagement of the opposite ends of the clamp rod 12 with the slots 4A of the cylindrical member 4, respectively, the guide member 5 is fixed to the cylindrical member 4.

In order to facilitate production and handling of the guide member 5, the guide member 5 is formed by a plurality of guide member sections 5' arranged vertically in series and fixed to the iron core 11 by the pins 40 as shown in FIG. 5 such that a transfer distance of the guide member 5 is lengthened. A small gap 16 is formed between neighboring ones of the guide member sections 5' of the guide member 5. In FIG. 5, since the gap 16 is set so as to be dimensionally smaller than an outer shape of each tablet A and the guide face 10 of the vane 9 of the downstream guide member section 5' is set slightly lower at the gap 16 than that of the upstream guide member section 5', such that the tablets A are not damaged by being caught in the gap 16. Therefore, the tablets A are transferred smoothly.

At the time of rinsing of the tablet transfer device K1, the tablet transfer device K1 may be disassembled. However, in order to facilitate maintenance of the tablet transfer device K1, the tablet transfer device K1 may be rinsed without disassembling and reassembling the tablet transfer device K1, namely, by so-called cleaning in place (CIP). In CIP, cleaning fluid is delivered into the cylindrical member 4 in the assembled tablet transfer device K1, the cleaning fluid is rinsed away by rinsing with water and then, the tablet transfer device K1 is dried with hot air, etc.

Dust produced by the tablets A due to their friction with one another is likely to penetrate into the gap 16 between the neighboring ones of the guide member sections 5' so as to remain at the gap 16. As a result, not only might sliding ability of the tablets A on the guide face 10 deteriorate but damage to the tablets A may occur or bacteria may be produced at the gap 16. However, in this embodiment, since the gap 16 is formed positively, cleaning fluid can be introduced into the gap easily so as to rinse the remaining dust, etc. simply. Furthermore, the cleaning fluid carried into the gap 16 can be easily rinsed away by rinsing with water and this rinsing water can be removed by air-drying or hot-air drying.

Meanwhile, in this embodiment, the gap 16 is formed between the neighboring ones of the guide member sections 5a. However, the neighboring ones of the guide member sections 5a may also be secured to each other by bonding, solvent welding or fusion bonding. Although the guide member 5 becomes large in size, the guide member 5 may also be formed by integral molding without being divided into the guide member sections 5a.

The vane 9 has an outside diameter of 104.5 mm and the guide face 10 formed on the upper face of the vane 9 is positioned so as to cover a space between the central shaft 8 and an inner peripheral surface 13 of the cylindrical member 4 when viewed from above. Thus, a whole outer peripheral edge 9a of the vane 9 extends in close proximity to the inner peripheral surface 13 of the cylindrical member 4 such that a clearance C of 0.25 mm, smaller than the size of each of the tablets A, is formed between the whole outer peripheral edge 9a of the vane 9 and the inner peripheral surface 13 of the cylindrical member 4. Therefore, the clearance C formed between the whole outer peripheral edge 9a of the vane 9 and the inner peripheral surface 13 of the cylindrical member is quite small, so that the tablets A are transferred without being caught in the gap 16 so as to flow on the guide face 10 in a plurality of layers piled on one another. Meanwhile, during CIP referred to above, since a portion of the cylindrical member 4, which confronts an outer periphery of the vane 9, shifts by merely rotating the central shaft 8 slightly, dust or foreign matter penetrating into the clearance can be scraped off and cleaning fluid or rinsing water penetrating into the clearance can be easily removed for drying.

A helical pitch of the vane 9 is generally set at 100 to 200 mm and, more preferably 130 to 160 mm. More specifically, the helical pitch of the vane 9 is determined by such factors as shape and specific gravity of the tablets A, slidable degree of the tablets A on the guide face 10, etc. Namely, according to size, weight, shape, etc. of the tablets A, slidability degree of the tablets A on the guide face 10 varies and the angle of the guide face 10, at which the tablets A start flowing by their own weight, changes. Thus, when the angle of the slope of the guide face 10 is set smaller than that necessary for sliding of the tablets A, the tablets A remain on the guide face 10. Therefore, the helical pitch of the vane 9 should be determined such that angle of slope of the guide face 10, which is suitable for the tablets A to be transferred, can be secured. On the other hand, if the helical pitch of the vane 9 is made exceedingly large, the angle of the slope of the guide face 10 becomes extremely large at the central shaft 8 of the vane 9, thereby resulting in excessively high transfer rates of the tablets A at the central portion of the cylindrical member 4. By setting the helical pitch of the vane at a value within a proper range, the tablets A in the several layers are transferred at a substantially identical peripheral speed.

Figure 4:
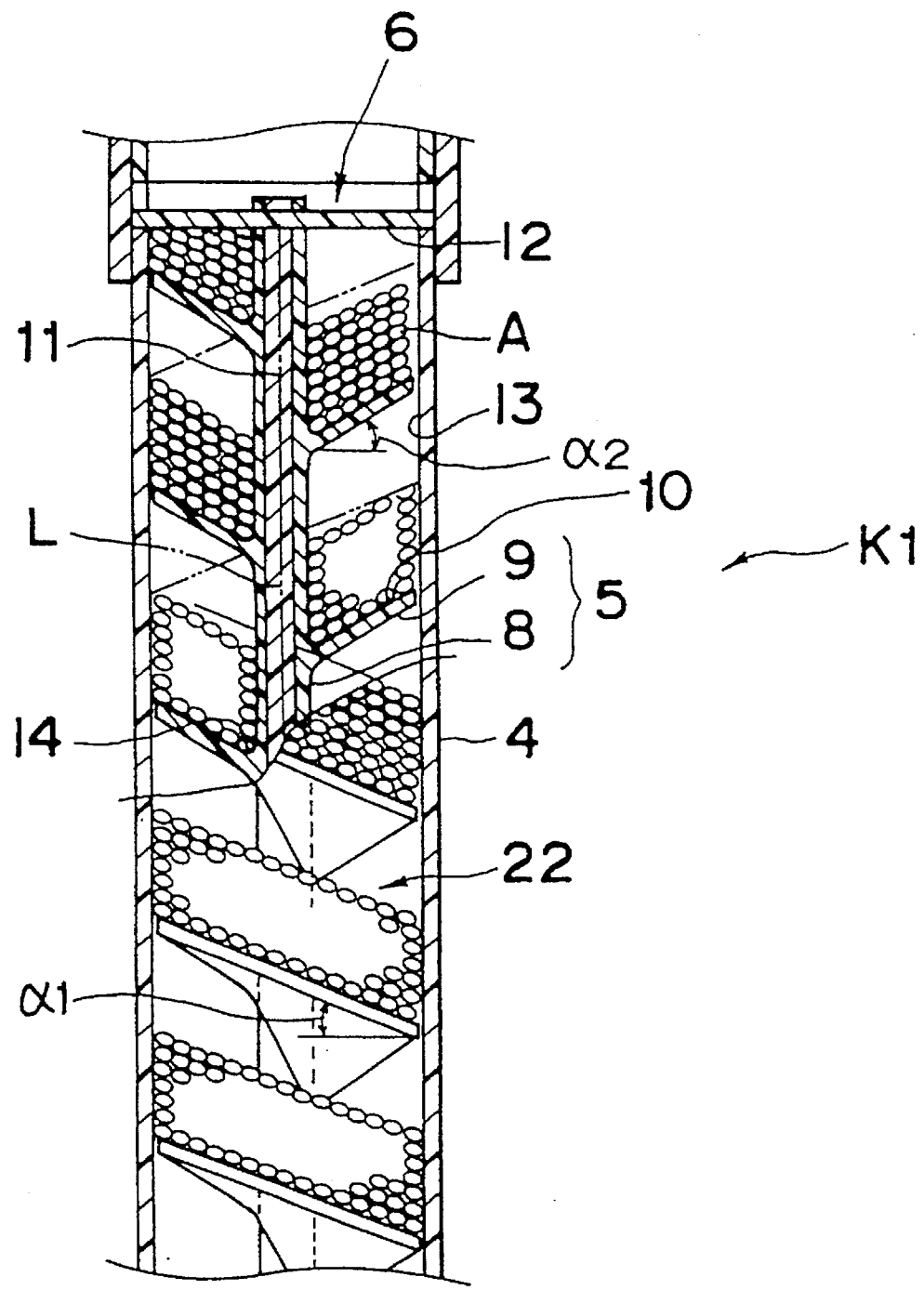
FIG. 4 is an enlarged fragmentary vertical sectional view of the tablet transfer device of FIG. 2.

In this embodiment, the outside diameter of the vane 9 is set at 104.5 mm and the helical pitch of the vane 9 is set at 130 to 160 mm, such that an angle $\alpha 1$ of the slope of the guide face 10 at its outer periphery is 20° to 26° as shown in FIG. 4. Therefore, in case the outside diameter of the vane 9, namely, the guide member 5 is changed, the helical pitch of the vane 9 is set accordingly so as to set the angle $\alpha 1$ of slope of the guide face 10 properly. Generally, it is preferable that this angle $\alpha 1$ of the slope of the guide face 10 at its outer periphery is set at 10° to 40°. Further, since the central shaft 8 has a diameter of 20 mm, the vane 9 projects from a center peripheral surface of the central shaft 8 by a radial distance larger than the diameter of the central shaft 8.

As shown in FIG. 4, the guide face 10 formed on the upper face of the vane 9 is inclined upwardly from the central shaft 8 at an angle of about 25° relative to the inner peripheral surface 13 of the cylindrical member 4. If this angle $\alpha 2$ of inclination of the guide face 10 is too large, the solid articles A do not flow on the guide face 10 stably. Therefore, generally, the angle $\alpha 2$ of inclination of the guide face 10 is desirably set at 40° or less. However, if the angle $\alpha 2$ of inclination of the guide face 10 is too small, the following effects gained by the sloping guide face 10 are not produced effectively. Accordingly, the angle $\alpha 2$ of inclination of the guide face 10 is desirably not less than 10°, and is more preferably 20°–30°.

By action of gravity, the tablets A will slidably flow on the sloping guide face 10 towards the axis L of the cylindrical member 4. Therefore, a component of a force, which is directed towards the axis L of the cylindrical member 4, is produced. Pressure or centrifugal force applied to the inner peripheral surface 13 of the cylindrical member 4 by the tablets A is eliminated by this component of the force. Therefore, since frictional resistance produced on the inner peripheral surface 13 of the cylindrical member 4 is reduced, the tablets A flow smoothly even at a radially outer portion on the guide face 10 along the inner peripheral surface 13 of the cylindrical member 4. Since frictional resistance of the tablets A in the lower layers is reduced, the tablets A in the lower layers are transferred at a peripheral speed substantially identical with that of the tablets A in the upper layers. As a result, since the tablets A as a whole flow at a uniform speed so as to form a conglomerate flow in which the tablets A behave integrally, the tablets A are stably transferred downwardly.

As shown in FIG. 4, a corner 14 between the central shaft 8 and the vane 9 is curved such that the tablets A flow smoothly without being clogged. The tablets A which have reached the tablet discharge portion 7 through their sliding flow on the guide face 10 are likely to be discharged at high speed unless an especially stable conglomerate flow is formed by the tablets A. However, after kinetic energy of the tablets A has been absorbed by a rubber shock absorber 17 provided on an inner surface of the discharge pipe 15, the tablets A are discharged smoothly through the discharge pipe 15.

Meanwhile, this shock absorber 17 may be any means which absorbs shock of the tablets A so as to prevent the tablets A from being subjected to large shock even if the tablets A transferred by the guide member 5 are discharged at high speed. Thus, in addition to the rubber shock absorber, an elastic member made of synthetic resin or formed by a spring, a flexible material such as a sponge, a bag containing gas such as air or liquid, a fibrous material such as a bag or a net, a brushlike member, a member from which gas such as air is spouted, etc. may be employed as the shock absorber 17.

As shown in FIG. 2, a clearance S between a lower end of the guide face 10 and a lower inner surface of the discharge pipe 15 is set at 70 mm or less, more preferably, 50 mm or less. Therefore, the tablets A are not subjected to large shock at the time of their drop and thus, are not damaged. Meanwhile, if the guide member 5 includes a plurality of the vanes 9 as will be described later, this clearance S is preferably set at 30 mm or more so as to allow the tablets A discharged from another guide face 10 to flow below the vane 9.

When viewed from above, the lower end of the guide face 10 intersects with an axis H of the discharge pipe 15 at an angle $\theta$ of 60° to 280°. By this arrangement, the tablets A discharged from the guide face 10 flow smoothly along the inner surfaces of the cylindrical member 4 and the discharge pipe 15 without impinging upon the inner surface of the discharge pipe 15 violently. The discharge pipe 15 is slopingly coupled with the cylindrical member 4 at an angle of not more than 20°, and more preferably 15° approximately 15°. Since the tablets A do not slidably flow in the discharge pipe 15 by their own weight, a vibrator (not shown) is provided on the discharge pipe 15 so as to discharge the tablets A smoothly.

When the sugar-coated tablets A have a diameter of 10 mm and a thickness of 6 mm, the tablet transfer device K1 of the above described arrangement is capable of transferring three million tablets A in about 15 min. without any tablet A remaining in the tablet transfer device K1. This is one-tenth of the period required for transferring the tablets A by a known shuttle type transfer device. Furthermore, none of the transferred tablets A has defects such as flaws, cracks and chippings.

Figure 7:
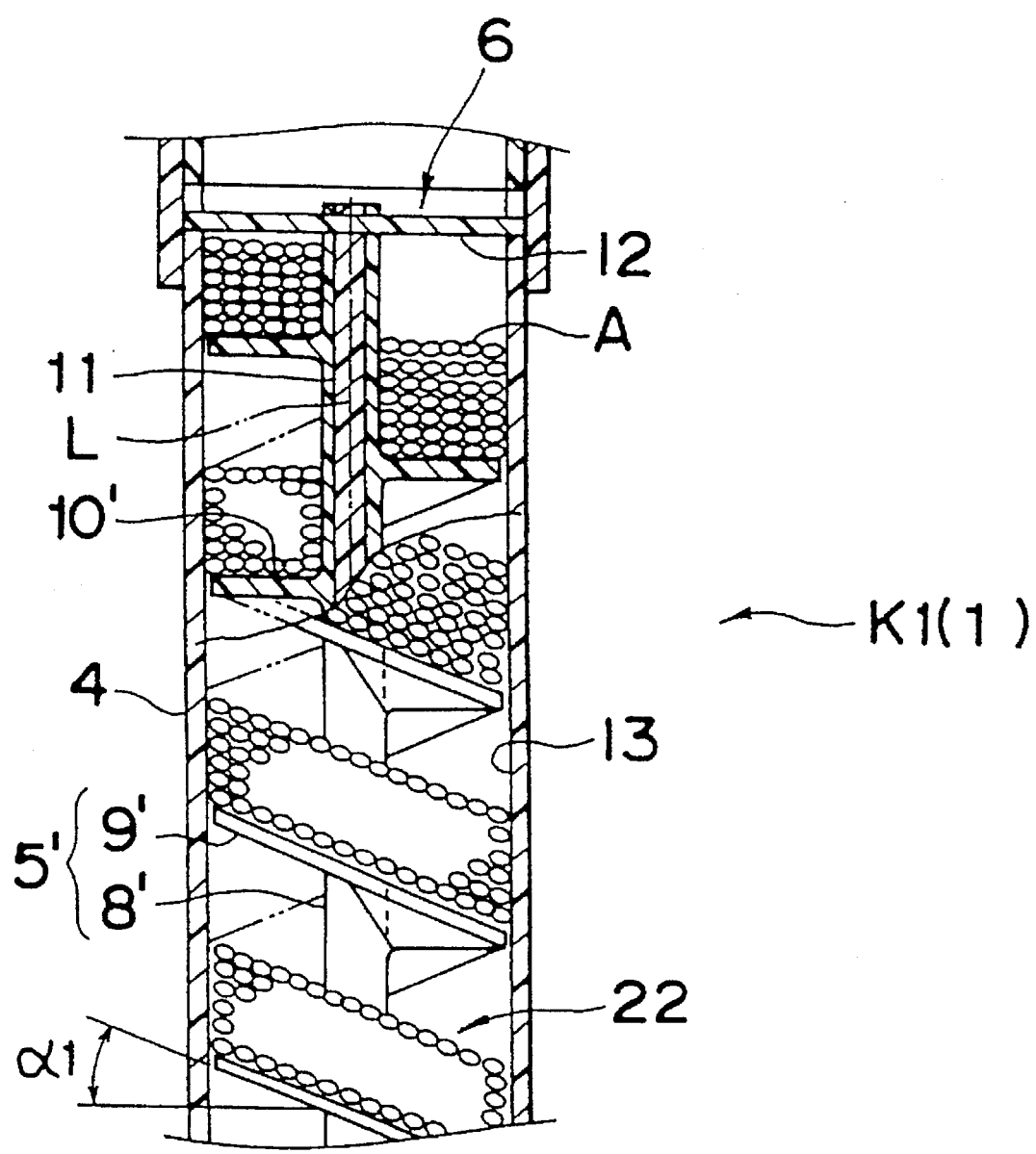
FIG. 7 is an enlarged fragmentary vertical sectional view of a tablet transfer device which is a first modification of the tablet transfer device of FIG. 2.

In the tablet transfer device K1, the guide face 10 is inclined upwardly from the axis L of the cylindrical member 4 towards the inner peripheral surface 13 of the cylindrical member 4. FIG. 7 shows a tablet transfer device K1(1) which is a first modification of the tablet transfer device K1. In the tablet transfer device K1 (1), a guide face 10' extends perpendicularly to the axis L of the cylindrical member 4. In this case, since frictional force between the guide face 10' and the tablets A in the lower layers is larger than that between the tablets A in the upper layers and the tablets in the lower layers, speed of the tablets A in the lower layers is reduced more than that of the tablets A in the upper layers. Therefore, difference of speed arises between the tablets A in the upper layers and those in the lower layers. Thus, while the tablets A are flowing in layers, the tablets A in each layer are integrally turned helically at a substantially identical peripheral speed so as to be transferred downwardly.

Figure 8:
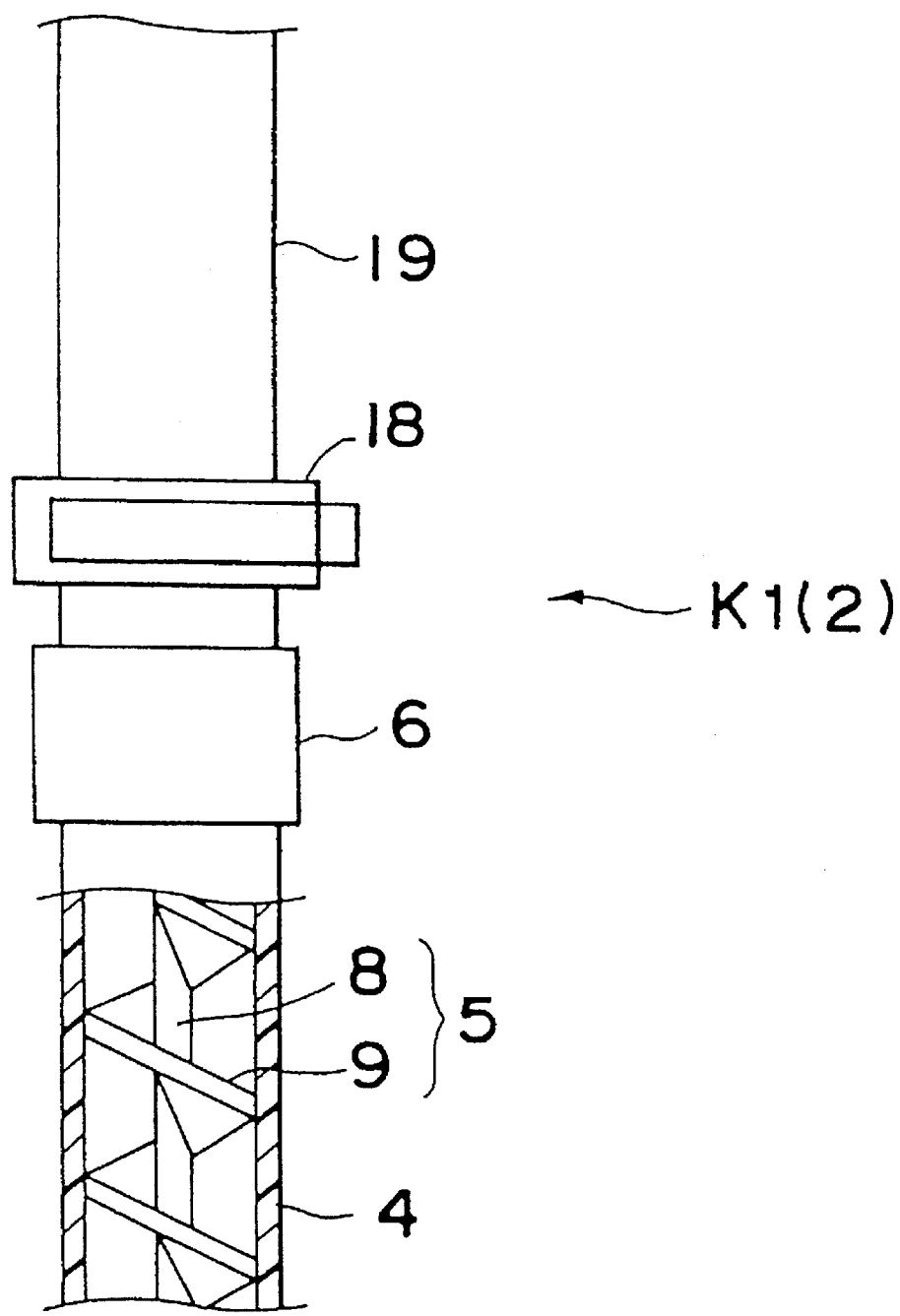
FIG. 8 is an enlarged partly broken front elevational view of a tablet supplying portion of a tablet transfer device which is a second modification of the tablet transfer device of FIG. 2.

Meanwhile, in the tablet transfer device K1, the tablet supplying portion 6 is directly coupled with an outlet of the tank 1. FIG. 8 shows a tablet transfer device K1(2) which is a second modification of the tablet transfer device K1. In the tablet transfer device K1(2), the tablet supplying portion 6 is coupled with the outlet of the tank 1 through an on-off valve 18 and the supply pipe 19. The on-off valve 18 controls supply of the tablets A. In addition, when the on-off valve 18 is closed, the tablets A are temporarily stored in the supply pipe 19 so as to eliminate such a phenomenon in which the tablets A accelerated in the supply pipe 19 impinge upon the tablet supplying portion 6 by flowing into the tablet supplying portion 6 at high speed. It is desirable that the on-off valve 18 should not damage the tablets A at the time of closing of the on-off valve 18.

Figure 9:
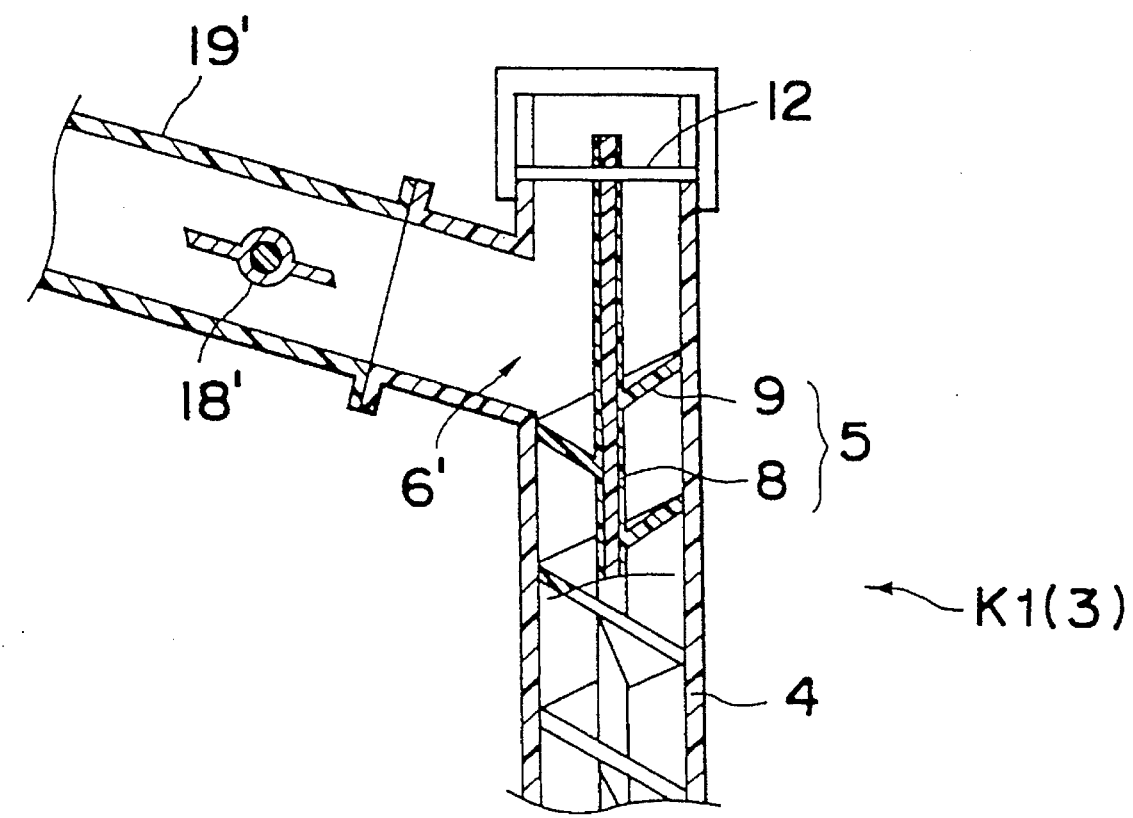
FIG. 9 is an enlarged vertical sectional view of a tablet supplying portion of a tablet transfer device which is a third modification of the tablet transfer device of FIG. 2.

As shown in FIG. 9 depicting a tablet transfer device K1(3) which is a third modification of the tablet transfer device K1, the supply pipe 19' may be coupled with a tablet supplying portion 6' which slopes upwardly. An angle of slope of the supply pipe 19' relative to the axis L of the cylindrical member 4 is set at not more than 20°, and more preferably approximately 15° such that the tablets A are not accelerated in the supply pipe 19' due to their sliding flow by their own weight. The supply pipe 19 is provided with a butterfly type on-off valve 18'. Furthermore, a vibrator (not shown) is provided on the supply pipe 19' so as to enable smooth supply of the tablets A. Meanwhile, since the supply pipe 19' is inclined relative to the axis L of the cylindrical member 4, the tablets A are slowly transferred in the supply pipe 19'. Therefore, the on-off valve 18' may be of the butterfly type or the shutter type. However, in order to eliminate such a phenomenon that the tablets A are damaged by impinging upon the on-off valve 18', it is desirable that rubber is provided on the valve body or the valve body itself is formed by elastic material such as silicone rubber.

Figure 10:
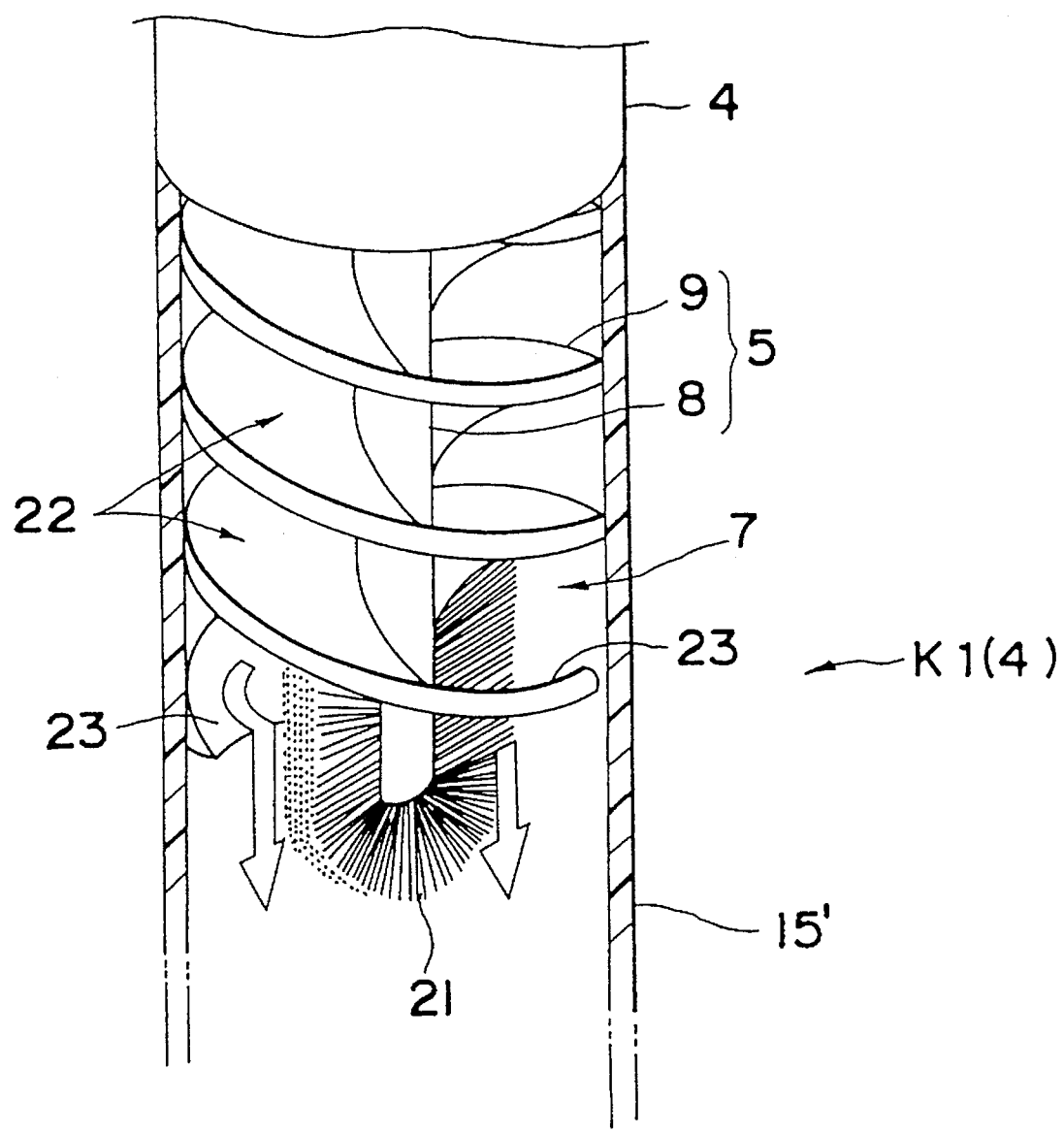
FIG. 10 is an enlarged partly broken perspective view of a tablet discharge portion of a tablet transfer device which is a fourth modification of the tablet transfer device of FIG. 2.

In the tablet transfer device K1, the discharge pipe 15 is slopingly coupled with the cylindrical member 4. However, a discharge pipe 15' may also be linearly coupled with the cylindrical member 4 so as to extend vertically. In this case, as shown in FIG. 10 illustrating a tablet transfer device K1(4) which is a fourth modification of the tablet transfer device K1, it is desirable that a cushioning member 21 is provided in the tablet discharge portion 7 so as to confront an outlet 23 of a helical guide passage 22. Namely, in the cushioning member 21 of the tablet transfer device K1(4), brushlike fibers are fixed to a lower end of the guide member 5 so as to extend outwardly from the central shaft 8 in a substantially horizontal direction. Thus, since kinetic energy of the helically transferred tablets A is absorbed by the cushioning member 21, the tablets A flow downwardly. In addition to the brushlike arrangement referred to above, the cushioning member 21 may be formed by a sheetlike member made of elastic material such as rubber, flexible material such as sponge, etc. and a fibrous member such as a net and a cloth. Furthermore, the cushioning member 21 may be formed by hanging a number of threadlike pieces such that the tablets A flow along the threadlike pieces. The cushioning member 21 is provided in the tablet transfer device K1(4) in which the discharge pipe 15' is linearly coupled with the cylindrical member 4 but may also be provided in the tablet transfer device K1 in which the discharge pipe 15 is slopingly coupled with the cylindrical member 4.

In the tablet transfer device K1, the discharge pipe 15 is coupled with the tablet discharge portion 7 so as to feed the tablets A into the hopper 2 for the next process. However, the tablet discharge portion 7 may also be coupled with a transfer container directly or through a discharge pipe as shown in FIGS. 11 to 14. In this case, a precautions such as the provision of a shooter at a distal end of the tablet discharge portion 7 or the discharge pipe, should be taken so as to obviate a risk that the tablets A fed into the transfer container will be damaged by shock.

Figure 11:
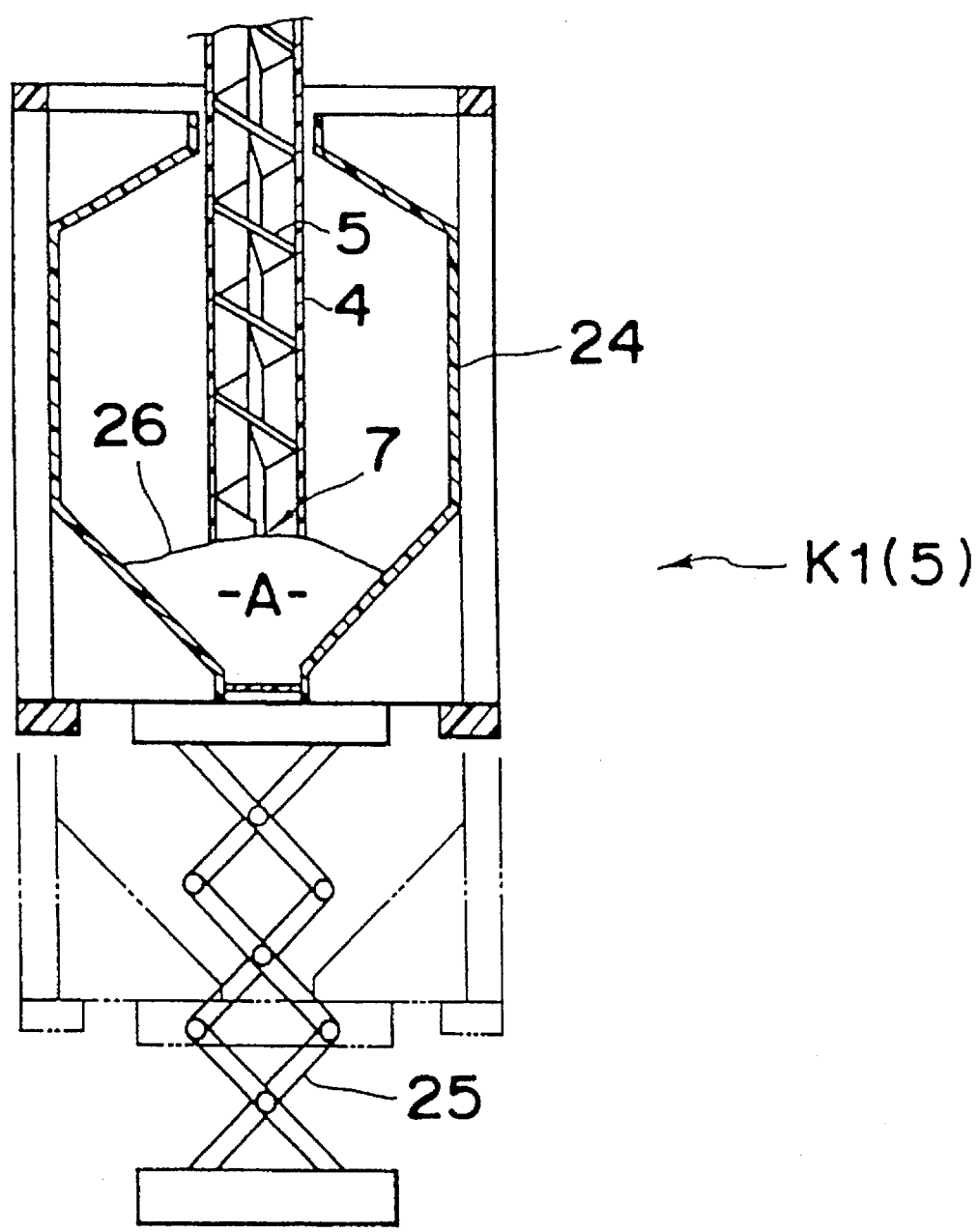
FIGS. 11 to 14 are enlarged vertical sectional views showing tablet discharge portions of tablet transfer devices which are fifth, sixth, seventh and eighth modifications of the tablet transfer device of FIG. 2, respectively.

For example, in FIG. 11 showing a tablet transfer device K1(5) which is a fifth modification of the tablet transfer device K1, the tablets A are directly discharged from the tablet discharge portion 7 into a transport container 24. At an initial stage of feeding of the tablets A into the transport container 24, the transport container 24 is lifted by a lift 25 so as to project a lower portion of the tablet transfer device K1(5) into the transport container 24. In response to progress of feeding of the tablets A into the transport container 24, the lift 25 is adjusted in lifting height so as to gradually lower the transport container 24 such that a distance between the tablet discharge portion 7 and an upper surface 26 of the tablets A fed into the transport container 24 is maintained at a predetermined value.

Figure 12:
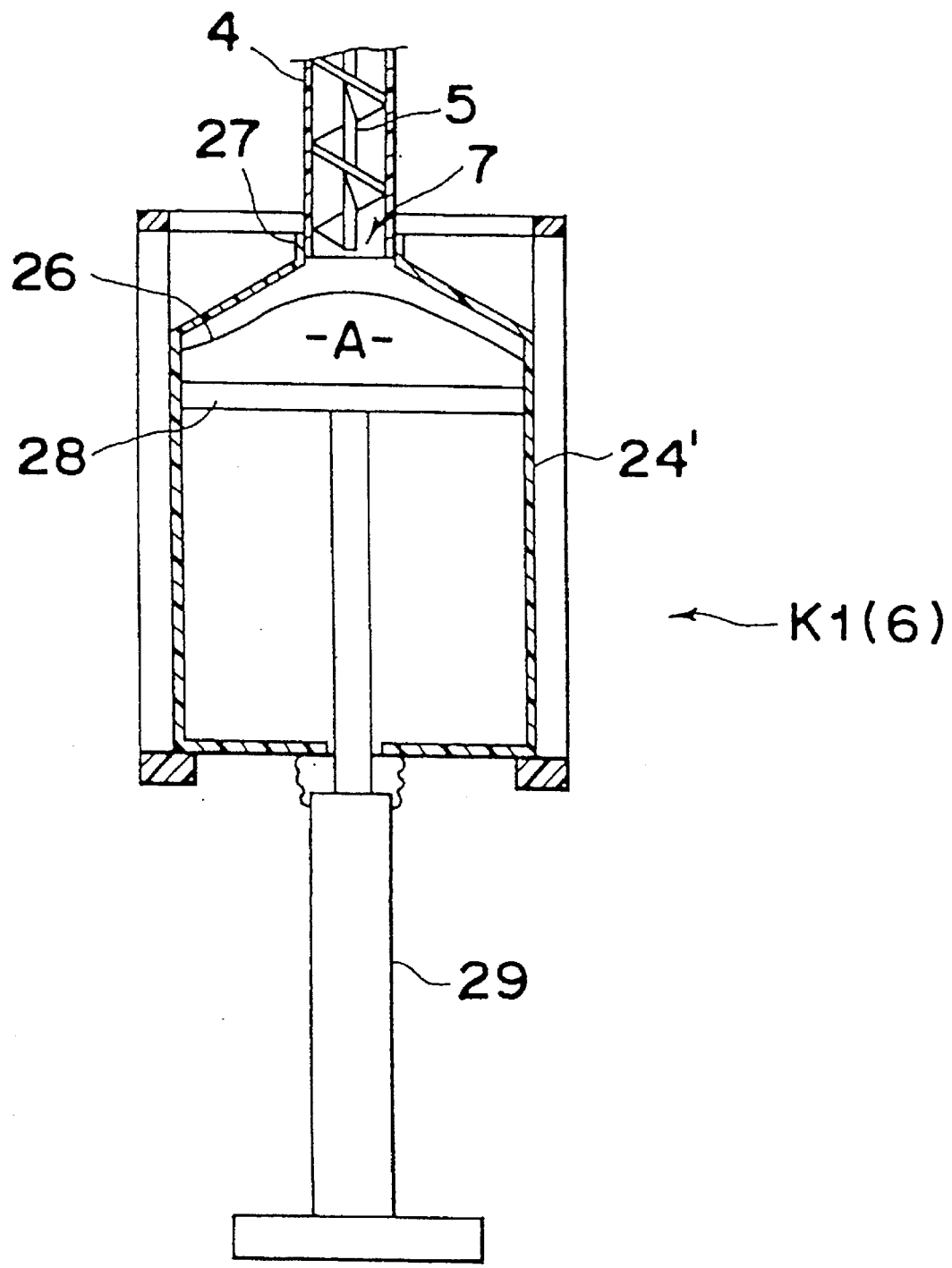

Meanwhile, in FIG. 12 showing a tablet transfer device K1(6) which is a sixth modification of the tablet transfer device K1, the tablet discharge portion 7 is mounted on a loading aperture 27 disposed at an upper portion of a transport container 24' and a bottom face 28 of the transport container 24' is coupled with a hydraulic cylinder 29 so as to be vertically movable in the transport container 24' by action of the hydraulic cylinder 29. Namely, at an initial stage of loading of the tablets A into the transport container 24', the bottom face 28 of the transport container 24' is raised by the hydraulic cylinder 29. However, in response to progress of loading of the tablets A into the transport container 24', the bottom face 28 of the transport container 24' is lowered gradually.

Figure 13:
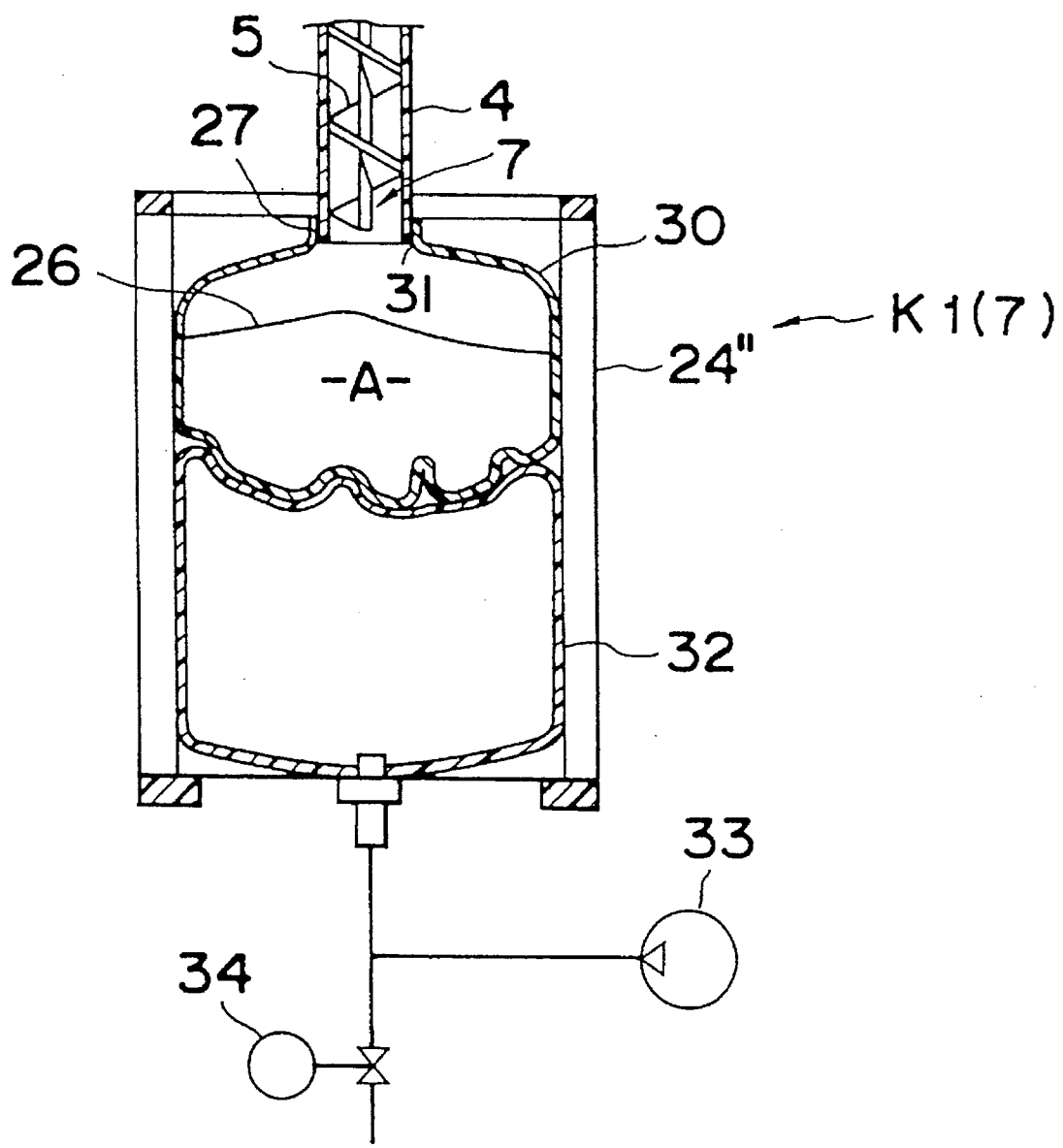

Furthermore, in FIG. 13 showing a tablet transfer device K1(7) which is a seventh modification of the tablet transfer device K1, the tablet discharge portion 7 is mounted on the loading aperture 27 disposed at the upper portion of the transport container 24', while an inlet 31 of a tablet bag 30 provided in the transport container 24' and the loading aperture 27 are coupled with each other so as to be communicated with each other. Furthermore, below the tablet bag 30, an air bag 32 is accommodated in the transport container 24' so as to be vertically movable in the transport container 24' by actuating an air pump 33 and operating an on-off control valve 34.

Figure 14:
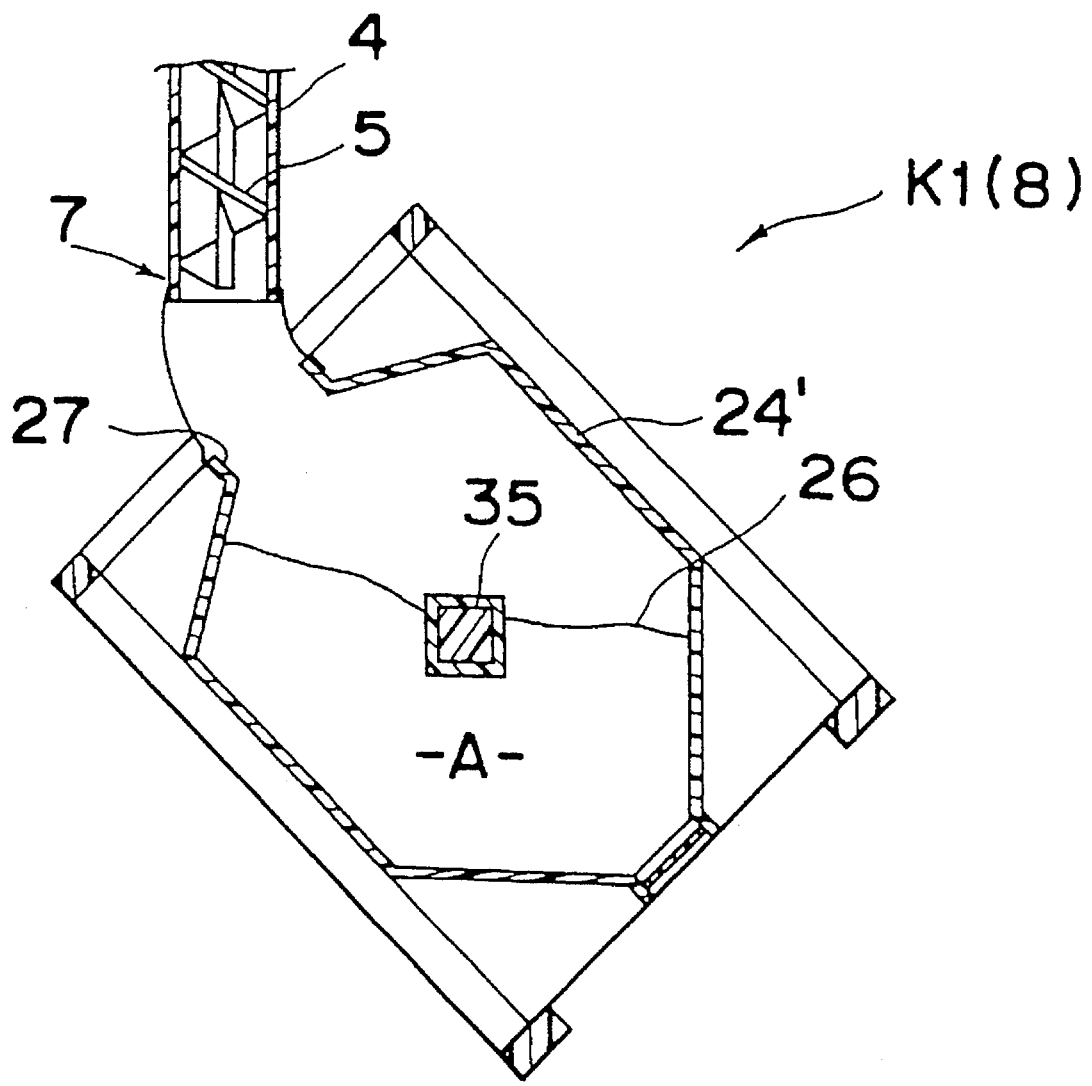

Moreover, in FIG. 14 showing a tablet transfer device K1(8) which is an eighth modification of the tablet transfer device K1, the tablet discharge portion 7 and the loading aperture 27 disposed at the upper portion of the transport container 24' are coupled with each other so as to be communicated with each other, while the transport container 24 is rotatably supported by a rotary shaft 35. At an initial stage of loading of the tablets A into the transport container 24', the transport container 24' is inclined as shown in FIG. 14. Then, in response to progress of loading of the tablets A into the transport container 24', the transport container 24' is gradually rotated. Thus, at the time of completion of loading of the tablets A into the transport container 24', the transport container 24' is set in a vertical orientation.

In the tablet transfer devices K1(5) to K1(8), the tablets A discharged from the tablet discharge portion 7 reach, without flowing through a long distance, the upper surface 26 of the tablets A loaded into the transport container. As a result, since the tablets A are not subjected to great shock at the time of loading of the tablets A into the transport container, damage to the tablets A can be prevented effectively.

Figure 15:
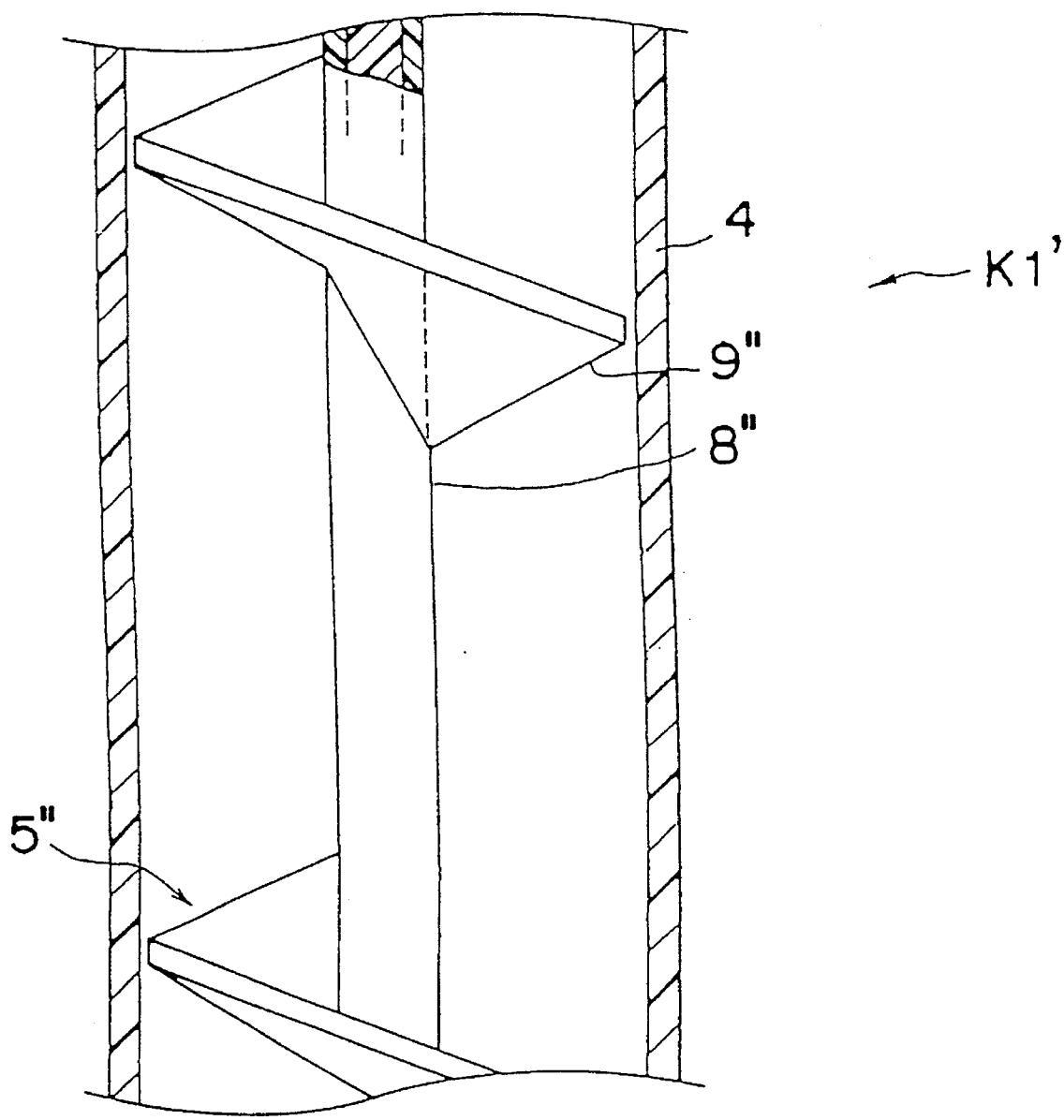
FIG. 15 is an enlarged fragmentary vertical sectional view of a tablet transfer device which is an alteration of the tablet transfer device of FIG. 2.

In the tablet transfer device K1, the guide member 5, i.e., both the central shaft 8 and the vane 9 extend continuously from the tablet supplying portion 6 to the tablet discharge portion 7. However, as shown in FIG. 15 depicting a tablet transfer device K1' which is an alteration of the tablet transfer device of FIG. 2, the vane 9' may be discontinuously provided between the tablet supplying portion 6 and the tablet discharge portion 7 from a standpoint of saving of materials used for the guide member 5'. In the tablet transfer device K1', the central shaft 8', needless to say, extends continuously from the tablet supplying portion 6 to the tablet discharge portion 7 as in the tablet transfer device K1. The guide member 5' of the tablet transfer device K1' functions in the same manner as that of the tablet transfer device K1.

Figure 16:
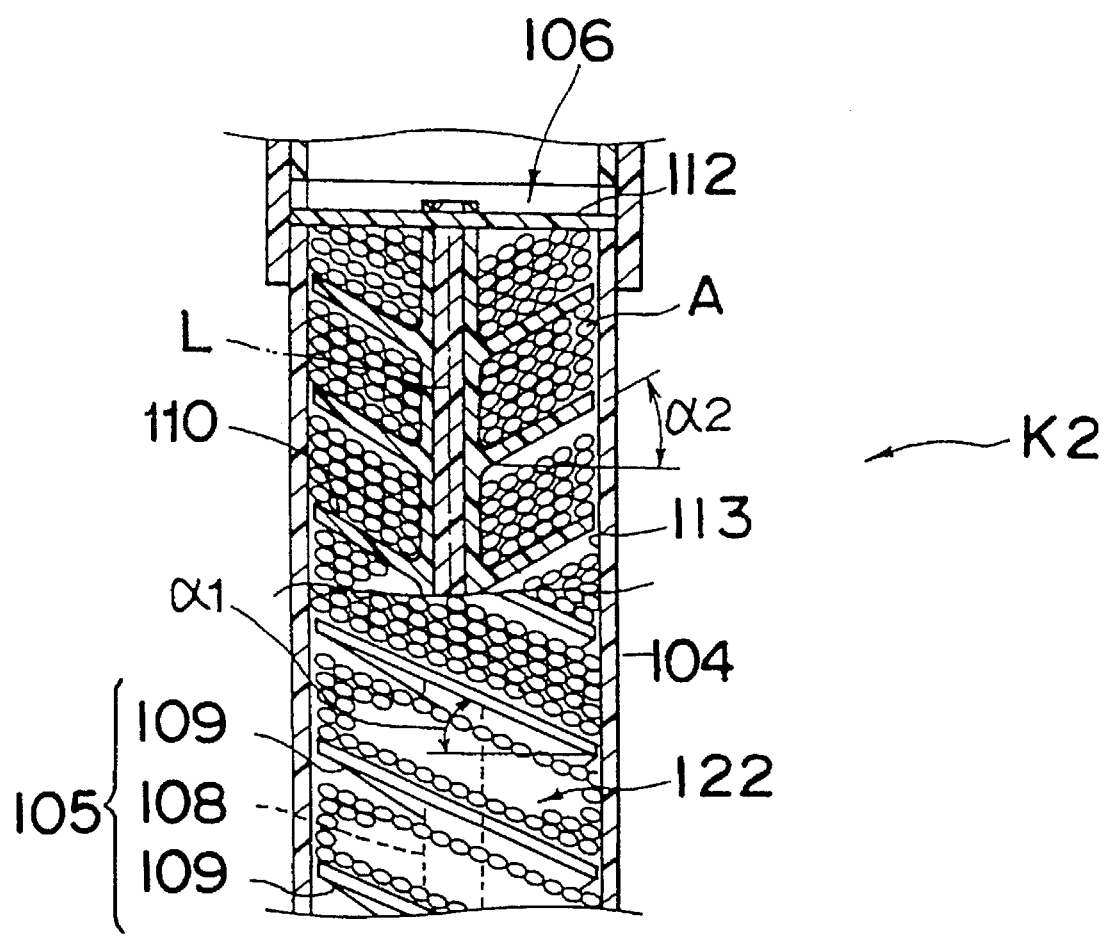
FIG. 16 is an enlarged fragmentary vertical sectional view of a tablet transfer device according to a second embodiment of the present invention.

FIG. 16 shows a tablet transfer device K2 according to a second embodiment of the present invention. In the tablet transfer device K2, two helical vanes 109 are formed around the central shaft 108 so as to overlap each other. In the tablet transfer device K2, since the layers of the tablets A piled on one vane 109 can be reduced in height, force applied to the tablets A in a lowermost layer can be reduced and transfer rate of the tablets A can be raised by reducing resisting force produced on the guide face 110 against the tablets A. Furthermore, a large amount of the tablets A as a whole can be transferred by the two vanes 109. As a result, in the tablet transfer device K2, transfer rate can be raised to not less than 1.8 times that of the tablet transfer device K1 having only one helical vane.

Meanwhile, in the tablet transfer device K2, the two vanes 109 are provided but may be replaced by not less than three vanes. Also when the guide member includes a plurality of the helical vanes as in the tablet transfer device K2, joints among the supply pipe, the discharge pipe and the guide member, the shock absorber and the cushioning member can be properly employed in combination in the same manner as the tablet transfer device K1. Especially, in case the cushioning member is provided at the lower end of the guide member so as to confront the outlet of the helical guide passage as in the tablet transfer device K1(4), the tablets discharged from a plurality of the guide passages do not impinge upon each other, so that the tablets can be downwardly transferred uniformly.

The first and second embodiments of the present invention deal with case in which a large amount of the tablets are transferred. However, it is needless to say that the present invention can also be applied to transfer of other solid articles and transfer of a small amount of solid articles.

The present invention has for its object to transfer a large amount of solid articles in a short period without incurring such defects of the solid articles as cracks and chippings and is not limited to the arrangements of the first and second embodiments. Therefore, material and outside diameter of the cylindrical member and the guide member, helical pitch of the guide member, angle of slope of the guide member at its outer periphery, angle of inclination of the guide face relative to the inner peripheral surface of the cylindrical member, etc. may be properly changed depending on the solid articles to be transferred. Meanwhile, the combination of these design factors may be kept constant from the solid article supplying portion to the solid article discharge portion or may alternatively be changed at the solid article supplying portion or the solid article discharge portion or over the length of the cylindrical member.

The transfer device of the above described arrangement achieves the following effects.

In the transfer device of the present invention, since the solid articles are transferred in a continuous close state, a large amount of the solid articles can be transferred in a short period. Furthermore, since the solid articles smoothly move on the guide face from the solid article supplying portion to the solid article discharge portion at a constant speed in a flow of layers or a conglomerate flow, the solid articles neither jump from the guide face nor impinge upon one another violently. Therefore, the solid articles are neither flawed on their surfaces nor damaged during their transfer.

Moreover, the transfer device is substantially constituted by the vertically extending cylindrical member and the guide member fixed in the cylindrical member, space occupied by the transfer device is lessened and its construction having no drive means is quite simple. As a result, the transfer device can be easily converted to automation or in-line application. In addition, the transfer device can be rinsed without the need for disassembling the transfer device, i.e. by CIP, thereby resulting in easy maintenance and inspection of the transfer device.

Meanwhile, since the solid articles are transferred by gravity, no power for transferring the solid articles need be provided and thus, the transfer device can be produced at low cost. Furthermore, since the solid articles are transferred downwardly, the device of the present invention can be applied to various factory systems in which solid articles, an upper process is continuously followed by a lower production process. For example, if a factory for producing tablets is built into three stories or more, a tablet machine, a coating machine, a packaging machine, an intermediate container, a printing machine, etc. are arranged vertically downwardly in this sequence so as to form a vertical flow of the tablets, and neighboring ones of these machines are coupled by the transfer device of the present invention, so that the products can be moved easily and smoothly.

According to an aspect of the present invention, since the clearance between the whole outer peripheral edge of the vane and the inner peripheral surface of the cylindrical member is set to be dimensionally smaller than the outer shape of each of the solid articles, it is possible to prevent the solid articles from being caught in the clearance or dropping from the clearance.

According to another aspect the present invention, the whole outer peripheral edge of the vane has an angle of slope ranging from 10° to 40°. Therefore, if each of the solid articles has a smooth spherical surface, the solid articles can be transferred along the guide face at proper speed.

According to another aspect the present invention, since the angle of slope of the vane is set to be gradually smaller towards the solid article discharge portion, the transfer rate of the solid articles at the solid article discharge portion can be made identical with that at the solid article supplying portion. Therefore, from the upper end to the lower end of the cylindrical member, the solid article can be transferred in the cylindrical member at a substantially identical speed.

According to another aspect of the present invention, the guide face of the vane is inclined upwardly from the axis of the cylindrical member towards the inner peripheral surface of the cylindrical member. Therefore, in addition to the above described effects, since centrifugal force produced by turning of the solid articles or pressure of the solid articles is received also by the sloping guide face so as to be scattered and is eliminated by a component of a force, which is produced by sliding flow of the solid articles towards the axis of the cylindrical member by action of gravity, force applied to the radially outermost solid articles is reduced and thus, the radially outermost solid articles can be moved smoothly. Furthermore, since frictional resistance of the solid articles in the lower layers is lessened and difference in speed between the solid articles in the upper layers and the solid articles in the lower layers is reduced. As a result, if each of the solid articles has a smooth spherical surface as in the case of sugar-coated tablets or film coated tablets, a larger amount of the solid articles can be transferred downwardly in conglomerate flow without being damaged.

According to another aspect of the present invention, since height of the solid articles piled on each vane can be reduced, force applied to the solid articles in the lowermost layer can be reduced and thus, resistance produced on the guide face can be lessened. Accordingly, transfer rate of the solid articles can be increased, so that a larger amount of the solid articles as a whole can be transferred by a plurality of the vanes.

According to another aspect of the present invention the cylindrical member is made transparent, and therefore the transfer state of the solid articles can be observed from outside. Meanwhile, if the cylindrical member and the guide member are molded by resin, surfaces of the cylindrical member and the guide member, which are brought into contact with the solid articles, can be made soft. Therefore, even if surface strength of the solid articles is small, the solid articles are not damaged through their contact with or their friction with the surfaces of the cylindrical member and the guide member. Furthermore, if the iron core is embedded in the central shaft of the guide member along the axis of the central shaft, strength of the guide member can be increased in the case where the guide member is long.

According to another aspect of the present invention, since the guide member can be easily removed from the cylindrical member, the cylindrical member and the guide member can be easily rinsed at the time of their rinsing or inspection by removing the guide member from the cylindrical member. Furthermore, foreign matter caught in the clearance between the cylindrical member and the guide member can be removed.

According to another aspect of the present invention, the cylindrical member has an inside diameter of 80 to 150 mm. Thus, in case the solid article are sugar-coated tablets or film coated tablets, the solid articles can be transferred at proper speed without being damaged.

According to another aspect of the present invention, since the solid articles are supplied from the supply pipe to the solid article supplying portion at low speed, the supplied solid articles do not undergo large shock and thus, damage, etc. to the solid articles can be prevented.

According to another aspect of the present invention, since the solid articles are temporarily received by the on-off valve, the solid articles supplied to the solid article supplying portion are not subjected to large shock and thus, damage to the solid articles can be prevented.

According to another aspect of the present invention, since the guide member is formed by a plurality of the guide member sections extending in series, which can be easily produced and handled, the transfer device having a long transfer distance can be produced at low cost. Furthermore, since the gap is formed between the neighboring ones of the guide member sections, rinsing and drying of the transfer device after its rinsing are facilitated and CIP requiring neither disassembly of the transfer device nor its reassembly can be performed easily, thereby resulting in easier maintenance of the transfer device.

According to another aspect of the present invention, since kinetic energy of the solid articles transferred helically is absorbed by the cushioning member, the solid articles can be discharged at low speed without being subjected to large shock. Furthermore, the solid articles are uniformly dropped downwardly by the cushioning member. Hence, even when the guide member includes a plurality of the vanes, the solid articles discharged from the respective helical guide passages do not impinge upon one another violently and thus, damage to the solid articles can be prevented effectively.

According to another aspect of the present invention, since the solid articles are discharged from the solid article discharge portion to the discharge pipe extending slopingly downwardly from the solid article discharge portion, the solid articles do not impinge upon one another violently and thus, can be discharged smoothly without being damaged.

According to another aspect of the present invention, since kinetic energy of the solid articles is absorbed by the shock absorber, the solid articles can be smoothly discharged to the discharge pipe by effectively preventing damage to the solid articles. In According to another aspect of the present invention, since the supply pipe is coupled with the solid article supplying portion through the on-off valve, kinetic energy of transfer of the solid articles in the supply pipe is absorbed by the on-off valve when the solid articles supplied from above are temporarily received by the on-off valve by closing the on-off valve.

According to another aspect of the present invention, when each of the solid articles has a smooth spherical surface, the solid articles can be transferred favorably by the transfer device of gravity type. Especially when the solid articles are sugar-coated tablets or film coated tablets, whose surface strength is small, the solid articles are transferred at a constant speed without jumping from the guide face of the vane and are prevented from impinging upon one another, so that surfaces of the solid articles are not damaged.

What is claimed is:

1. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft; and wherein an angle of helical slope of said vane reduces gradually towards said discharge port.

2. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft;

wherein said cylindrical member is formed of transparent resin;

wherein said guide member is formed of resin and is integral with said central shaft; and wherein an iron core is embedded in said central shaft along said longitudinal axis.

3. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft; and an elongated iron core is mounted along said longitudinal axis, said central shaft sections of said guide member sections being mounted along said iron core.

4. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft; and wherein a discharge pipe is coupled with said article discharge port and extending downwardly and away therefrom at an inclination relative to said longitudinal axis.

5. A transfer device as recited in claim 4, wherein a shock absorber is provided at a portion of an inner surface of said discharge pipe disposed immediately below said discharge port.

6. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft;

wherein a clamp rod, perpendicular to said longitudinal axis, is fixed to an upper end of said central shaft;

wherein slots are formed in an upper edge of said cylindrical member; and wherein said clamp rod is removably mounted in said slots such that said guide member is detachably fixed in said cylindrical member.

7. A transfer device as recited in claim 6, wherein an upper guide face of said vane is inclined radially outwardly and upwardly from a radially inner edge of said vane to a radially outer periphery of said vane.

8. A transfer device as recited in claim 7, wherein said upper guide face of said vane is inclined radially outwardly and upwardly, at an angle of 10 to 40 degrees, from said radially inner edge of said vane to said radially outer periphery of said vane.

9. A transfer device as recited in claim 6, wherein said upper end of said cylindrical member is open over an entire cross section thereof; and said lower end of said cylindrical member is open over an entire cross section thereof.

10. A transfer device as recited in claim 6, wherein said cylindrical member is circular in cross section.

11. A transfer device as recited in claim 6, wherein an outer peripheral edge of said helical vane has an angle of helical slope of 10 to 40 degrees.

12. A transfer device as recited in claim 6, wherein said guide member includes at least one additional helical vane, so as to comprise a plurality of vanes, said plurality of vanes defining separate overlapping helices.

13. A transfer device as recited in claim 6, further comprising a supply pipe coupled with said article inlet and extending upwardly and away therefrom at an inclination relative to said longitudinal axis.

14. A transfer device as recited in claim 6, further comprising an on-off valve interposed between said supply pipe and said article inlet.

15. A transfer device as recited in claim 6, further comprising a cushioning member mounted in confronting relation to said article discharge port.

16. A transfer device for use vertically between an upper apparatus for carrying out a process and a lower apparatus for carrying out a subsequent process to feed pharmaceutical solid articles from the upper apparatus to the lower apparatus by gravity, said transfer device comprising:

a hollow cylindrical member having an open upper end constituting a pharmaceutical article inlet, and an open lower end constituting a pharmaceutical article discharge port;

a pharmaceutical solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft;

wherein a clamp rod, perpendicular to said longitudinal axis, is fixed to an upper end of said central shaft;

wherein slots are formed in an upper edge of said cylindrical member; and wherein said clamp rod is removably mounted in said slots such that said guide member is detachably fixed in said cylindrical member.

17. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft; and wherein said vane comprises a plurality of discontinuous vane sections mounted in longitudinal succession along said central shaft, such that gaps are formed between adjacent ones of said vane sections.

18. A transfer device for use vertically between an upper apparatus for carrying out a process and a lower apparatus for carrying out a subsequent process to feed solid articles from the upper apparatus to the lower apparatus by gravity, said transfer device comprising:

a hollow cylindrical member having an open upper end constituting an article inlet, and an open lower end constituting an article discharge port;

a solid article guide member fixedly mounted in said hollow cylindrical member and extending from said upper end to said lower end thereof;

wherein said guide member comprises a central shaft extending along a longitudinal axis of said cylindrical member, and a helical vane mounted about said central shaft and projecting radially outwardly from an outer peripheral surface of said central shaft by a radial distance larger than an outer diameter of said central shaft; and wherein said guide member comprises a plurality of discrete guide member sections, each having a central shaft section and a vane section, mounted in longitudinal succession along said longitudinal axis with gaps formed between adjacent ones of said guide member sections.

* * * * *